United States Patent
Horozoglou

(10) Patent No.: US 12,030,673 B2
(45) Date of Patent: Jul. 9, 2024

(54) SYNCHRONOUS POLYPHASE ALTERNATING CURRENT ELECTROSTATIC ION THRUSTER (SPACE-IT) FOR PROPULSION OF SPACECRAFT, SUCH AS FOR EXAMPLE SATELLITES, MINI-ROCKETS, ETC

(71) Applicant: Vassilios Horozoglou, Worpswede (DE)

(72) Inventor: Vassilios Horozoglou, Worpswede (DE)

( * ) Notice: Subject to any disclaimer, the term of this patent is extended or adjusted under 35 U.S.C. 154(b) by 0 days.

(21) Appl. No.: 18/305,255

(22) Filed: Apr. 21, 2023

(65) Prior Publication Data
US 2023/0348114 A1    Nov. 2, 2023

(51) Int. Cl.
*B64G 1/40*    (2006.01)

(52) U.S. Cl.
CPC .................. *B64G 1/405* (2013.01)

(58) Field of Classification Search
CPC .... F03H 1/0025; F03H 1/0037; F03H 1/0043; F03H 1/0056; F03H 1/0062; F03H 1/0068; F03H 1/0075
See application file for complete search history.

(56) References Cited

U.S. PATENT DOCUMENTS

| | | | | |
|---|---|---|---|---|
| 5,559,391 A | * | 9/1996 | Valentian | H01J 27/024 313/360.1 |
| 2007/0114903 A1 | * | 5/2007 | Tolmachev | H05H 1/54 313/231.31 |

FOREIGN PATENT DOCUMENTS

| | | |
|---|---|---|
| CN | 111520301 A | 8/2020 |
| CN | 214577557 U | 11/2021 |
| KR | 20060057994 A | 5/2006 |

\* cited by examiner

*Primary Examiner* — Arun Goyal
*Assistant Examiner* — William L Breazeal
(74) *Attorney, Agent, or Firm* — Jonathan M. D'Silva; MMI Intellectual Property

(57) ABSTRACT

An Electrostatic Ion Thruster for propulsion of spacecraft, comprising an ionization chamber with a central axis, a propellent gas inlet port, an inlet, an exit and an igniter between the propellent gas inlet port and the inlet of the ionization chamber, a propellent gas source, an ion accelerator arranged at the exit of the ionization chamber opposite the propellent gas inlet port in the direction of the central axis, the ion accelerator including at least three acceleration grids spaced apart from each other in the direction of the central axis and each extending perpendicular to the central axis, an ignition circuit electrically connected to the igniter, at least three high frequency coils surrounding at least a part of the ionization chamber, a high frequency ionization power generating unit electrically connected to the high frequency coils, and a polyphase high voltage high frequency power generating unit electrically connected to the acceleration grids.

14 Claims, 9 Drawing Sheets

SYNCHRONOUS POLYPHASE ALTERNATING CURRENT ELECTROSTATIC ION THRUSTER (SPACE-IT) FOR PROPULSION OF SPACECRAFT, SUCH AS FOR EXAMPLE SATELLITES, MINI-ROCKETS, ETC

The present application relates to a synchronous polyphase alternating current electrostatic ion thruster (SPACE-IT) for propulsion of spacecraft, such as for example satellites, mini-rockets, etc., or wherever an ion accelerator is needed. In particular, the present invention relates to a "Synchronous Polyphase Alternating Current (AC)" of High Frequency (preferably 0.6 MHz to 10 MHz) High Voltage "Electrostatic Ion Thruster" (SPACE-IT) which can be used for e. g. a spacecraft propulsion system or wherever an ion accelerator is needed.

BACKGROUND

Although chemical propulsion thrusters are widely used in spacecrafts, an alternative technique of electrical propulsion is well known from e. g. U.S. Pat. No. 3,052,088 to Davis at al., U.S. Pat. No. 3,156,090 to Kaufman, U.S. Pat. No. 2,952,970 to Blackman, U.S. Pat. No. 2,880,337 to Langmuir at al., DE19948229 C1 R. Killinger et al. or EP0560742 A1 M. Gianfranco et al., describing typical electrical propulsion devices.

Electrostatic ion thrusters are well known to provide very high specific impulse respectively high exhaust gas velocities compared to chemical propulsion thrusters, which mean that they need at equivalent thrust level much less propellants mass.

But, despite of this, the performance of the todays technology/method of the electrostatic ion thrusters using Direct Current (DC) as acceleration Voltage, is limited.

Because of the nature of these thrusters, i.e. using Direct Current (DC) as acceleration Voltage, they require very specific and as such very expensive grid materials in order to overcome a problem of grid degradation due to the sputtering phenomena, when the ions are hitting the grids at very high velocity. This of course reduces the life of the ion thruster on one hand and on the other hand it could result into electrically shortage of the grids, because of possible accumulation of grid material deposits, with a catastrophic loss of the ion thruster.

In order to overcome this problem, a grid clear circuit and method is provided in EP 2 722 278 A2. The known method uses high current sufficient to electrically melt/burn the deposits. Consequently, the propulsion system needs an additional specific circuit onboard and of course certain recovery time.

The other, also very critical phenomenon of the Direct Current (DC) electrostatic ion thrusters is that, since the electrons which are extracted from the propellant gas atoms, in order to generate ions, are assimilated by the thruster itself, the thruster and consequently the spacecraft start to electrostatically be charged up. If no additional method is used, in the worst case the thruster respectively spacecraft will be charged up in a such high level, that no more thrust can be generated, as the ions are strongly attracted by the electrostatically negative charged spacecraft.

In order to overcome this problem, an additional system becomes necessary, the function of which is to neutralize the ions at the exit of the thruster, in fact on a level, that the majority of the ions are neutralized by giving them back the electron extracted in the ionization chamber before. In this way, when the spacecraft is electrostatically negative charged up, as the ions are electrostatically neutralized, they cannot be attracted by the spacecraft and so the thruster can generate the wished thrust.

This additional system of course makes on one hand the thruster design complex and consequently expensive and more sensitive to system failure and on the other hand it requires additional propellants in order to generate the wished number of electrons.

A further disadvantage to be mentioned, because of the used Direct Current (DC) as acceleration voltage is that, by its nature, the ions which are accelerated by the negative polarised acceleration grid when leaving the thruster are attracted back to the exit acceleration grid up to the time of neutralisation and as such they are de-accelerated losing in this way certain level of the maximum achievable ion velocity which, in turn, result into the reduction of the maximum achievable Specific Impulse.

Accordingly, it is the object of the invention to provide an electrostatic ion thruster providing at least one of much higher ion velocity, much higher specific impulse, higher efficiency of ion generation and no need of an ion neutralizer.

SUMMARY

This object is achieved by an electrostatic ion thruster for propulsion of spacecraft, such as for example satellites, mini-rockets, etc., comprising an ionization chamber with a central axis, the ionization chamber including a propellent gas inlet port for a propellent gas to be ionized in the ionization chamber, an inlet, an exit and an igniter between the propellent gas inlet port and the ionization chamber, a propellent gas source for a propellent gas to be ionized, the propellent gas source being connected to the propellent gas inlet port and adapted to supply an ionizable propellent gas through the propellent gas inlet port into the ionization chamber, an ion accelerator arranged the exit end of the ionization chamber opposite the propellent gas inlet port in the direction of the central axis of the ionization chamber, the ion accelerator including at least three acceleration grids spaced apart from each other in the direction of the central axis of the ionization chamber and each extending perpendicular to the central axis of the ionization chamber, an ignition circuit electrically connected to the igniter and adapted together with the igniter to generate an electrostatic field that is able to generate negative ions of a supplied propellent gas that are transported to the inlet of the ionization chamber by the nominal flow of the propellent gas, at least three high frequency, HF, coils surrounding at least a part of the ionization chamber, a high frequency ionization power generating unit electrically connected to the at least three HF coils to generate a high frequency linear traveling electromagnetic field travelling from the inlet towards to the exit of the ionization chamber and able to ionize the propellent gas in the ionization chamber, and a polyphase high voltage power generating unit electrically connected to the at least three acceleration grids of the ion accelerator and adapted together with the acceleration grids to accelerate the generated ions towards an exit of the ion accelerator. It is to be noted that in the simplest form the thruster does not even have to comprise a propellent gas source. It must be only connectable to a propellent gas source.

In a special embodiment the polyphase high voltage high frequency power generating unit is adapted to generate a polyphase high voltage high frequency alternating current and to generate a linear traveling electrostatic field across the at least three acceleration grids, preferably wherein there is a phase shift of 120° between the phases of the alternating current (19) in case of three phases or a phase shift of 60° in case of six phases.

Preferably there are at least three of the acceleration grids electrically connected to the polyphase high voltage high frequency power generating unit and the polyphase high voltage high frequency power generating unit is at least a 3-phases high voltage power generating unit, wherein the sequence of the phases of the polyphase high voltage high frequency power generating unit is set such that the generated linear traveling electrostatic field is from an inlet towards to an exit of the ion accelerator.

According to a further special embodiment the respective applied voltages of the phases are the same and the distances between adjacent acceleration grids increases from an/the inlet (first grid) of the ion accelerator to an/the exit (last grid) of the ion accelerator.

In particular, in case of three phases and corresponding a first to third acceleration grids in the order from the inlet to the exit of the ion accelerator a distance d2 between a second acceleration grid and a third acceleration grid correspond to the solution of the equation:

$$d2^2 - d1*d2 - 3.3127*d1^2 = 0,$$

where d1 is a distance between a first acceleration grid and the second acceleration grid, in particular wherein the respective applied voltages of the phases are the same, in case of six phases and corresponding first to sixth acceleration grids in the order from the inlet (39) to the exit (40) of the ion accelerator (4) the distances d2, d3, d4, d5 corresponds to the solution of the equations:

$$d2^2 - d1*d2 - 3{,}6506*d1^2 = 0$$

$$d3^2 - d2*d3 - 0{,}6230*d2^2 = 0$$

$$d4^2 - d3*d4 - 0{,}2071*d3^2 = 0$$

$$d5^2 - d4*d5 - 0{,}1194*d4^2 = 0$$

where d1, d2, d3, d4, d5 are the distances between a first, second, third, fourth, fifth and sixth acceleration grid, in particular wherein the respective applied voltages of the phases are the same.

According to another special embodiment, the distances between respective adjacent acceleration grids are the same and the respective applied voltages of the phases decrease from the inlet (first grid) of the ion accelerator to the exit (last grid) of the ion accelerator.

Preferably, the at least three acceleration grids are defined within a full body of electrical insulating material, e.g. ceramic or e.g. quartz-glass.

Preferably the polyphase high voltage high frequency power generating unit is adapted to generate an at least polyphase (e.g. 3-phases) alternating current, the frequency thereof being set according to the equation $$f = \sqrt{C1_{(d1)} * C2_{(d1)}^2 * q * U_R / (m*d1^2)}$$

where q is the elementary charge 1.6022E-19 in A*s, $U_R$ is the voltage of the polyphase alternating current in Volts, m is the Atom mass of the used gas in kg, d1 is the distance between the first acceleration grid and the second acceleration grid and $C1_{(d1)}$ and $C2_{(d1)}$ are constants depending on the number of phases, the ion passage trough the second grid and the shape of the alternating current generated by the polyphase high voltage high frequency power generating unit.

In particular, the shape of the polyphase alternating current maybe a Sinus-shape or a rectangular shape.

According to a further special embodiment, there is a symmetrical phase shift of 120° between the phases of the alternating current, in particular, when rectangular shaped, with a delay greater than zero, e.g. 10°, between the end of a positive half-wave and the beginning of a negative half-wave or vice versa. For sinus shape alternating current this delay is not necessary.

Preferably the polyphase high voltage HF power generating unit comprises a 3-phase double-H-bridge, preferably comprising six high voltage, HF, high power MOSFETs, for generating rectangular shaped alternating current.

Preferably the ionization chamber is conically, in particular comprising a body preferably made of electrically insulating material and with less loss to magnetic fluxes, e.g. ceramic or e.g. quartz-glass.

Preferably the at least three phases high frequency ionization power generating unit is adapted to generate alternating current with a frequency in a range of preferably 0.6 MHz to 2 MHz, in particular said frequency being adapted to a frequency of the alternating current generated by the polyphase high voltage high frequency power generating unit.

According to another preferred embodiment the high frequency coils are covered by rings or of ferromagnetic material, preferably with very high electrical resistance and very low resistance to the magnetic fluxes and formed such as the electromagnetic field is directed towards the central axis of the ionization chamber. In particular, the electrical resistance can be greater than for example 10 MOhm. The resistance to the magnetic fluxes can mean a permeability of greater than for example 15000.

Finally, preferably the igniter comprises lamellae electrically connected to the high voltage direct current generated by the ignition circuit.

With this invention, through the linear traveling electrostatic field, established by the polyphase alternating current, it can result into very high ion velocities and, in turn, it results to very high Specific Impulse (Isp) compared to a DC-Ion thruster with the same properties.

At least in a special embodiment the electrostatic ion thruster provides a much higher ion velocity, in particular >2 times comparing with a DC ion thruster with the same properties, and/or a higher efficiency of ion generation, in particular >85%, and/or no need of an ion neutralizer.

According to an embodiment of the present invention, since the electrons which are gained from the same ions mentioned above will not be absorbed by the ionization chamber, they are waiting within the ionization chamber up to the time when they will be attracted by the linear traveling electrostatic field and captured by the first acceleration grid when the voltage has a positive value. As soon as the polarity changes from positive to negative value, whereas at the same time the voltage of the next acceleration grid has a positive value (i.e. shift by 120° in case of three phases) and so the linear traveling electrostatic field, for the electrons, has a direction towards the next acceleration grid and so on, thus the electrons are then accelerated to the ion accelerator exit, of course by a shift of 180° (half period of the alternating current) compared to the ions.

As the velocity of the electrons is much higher than the velocity of the ions (comparing the mass of the ion to the mass of the electron), even the electrons are accelerated in the next half wave of the alternating current onto the first acceleration grid, they will reach the ions shortly after the exit of the ion thruster and so neutralize them. Thus, a separate neutralizer function, compared to a DC-ion thruster, is not necessary and so simplifies the design of the system on one hand and on the other hand no additional propellant is necessary in order to generate the needed electrons.

As said, the neutralizer in a DC-ion thruster is mandatory in order to avoid loss of thrust capability, because the ions are massively attracted back to the spacecraft when the spacecraft is sufficiently electrostatically negative charged up.

According to an embodiment of the present invention, the electrons are also forth accelerated still at a certain distance from the accelerator exit and so contribute to the neutralization of the ions and consequently avoids an electrostatically charging up of the ion thruster respectively spacecraft.

As in an embodiment the ions and electrons are accelerated towards the exit in the corresponding half wave of the polyphase alternating current, i.e. by a shift of 180°, this will result that the ion plasma leaving the ion thruster is not continuous, like in a DC-ion thruster, but rather pulsed, in a frequency equal to the frequency of the polyphase alternating current.

In contrast to the already existing Radio-Frequency ionizers, the ions respectively the electrons are radially counter-rotating along the axis of the ionization chamber following the linear traveling electromagnetic field from the inlet of the ionization chamber towards to the inlet grid of the ion accelerator.

Because the track of the ions and electrons keep their initial direction, they can achieve very high velocities respectively very high kinetic energy enhancing the self-sustaining generation of ions and electrons.

BRIEF DESCRIPTION OF DRAWINGS

Further features and advantages of the invention will emerge from the appended claims and from the following description of exemplary embodiments on the basis of the schematic drawings. In the figures:

DETAILED DESCRIPTION

Figure 1:
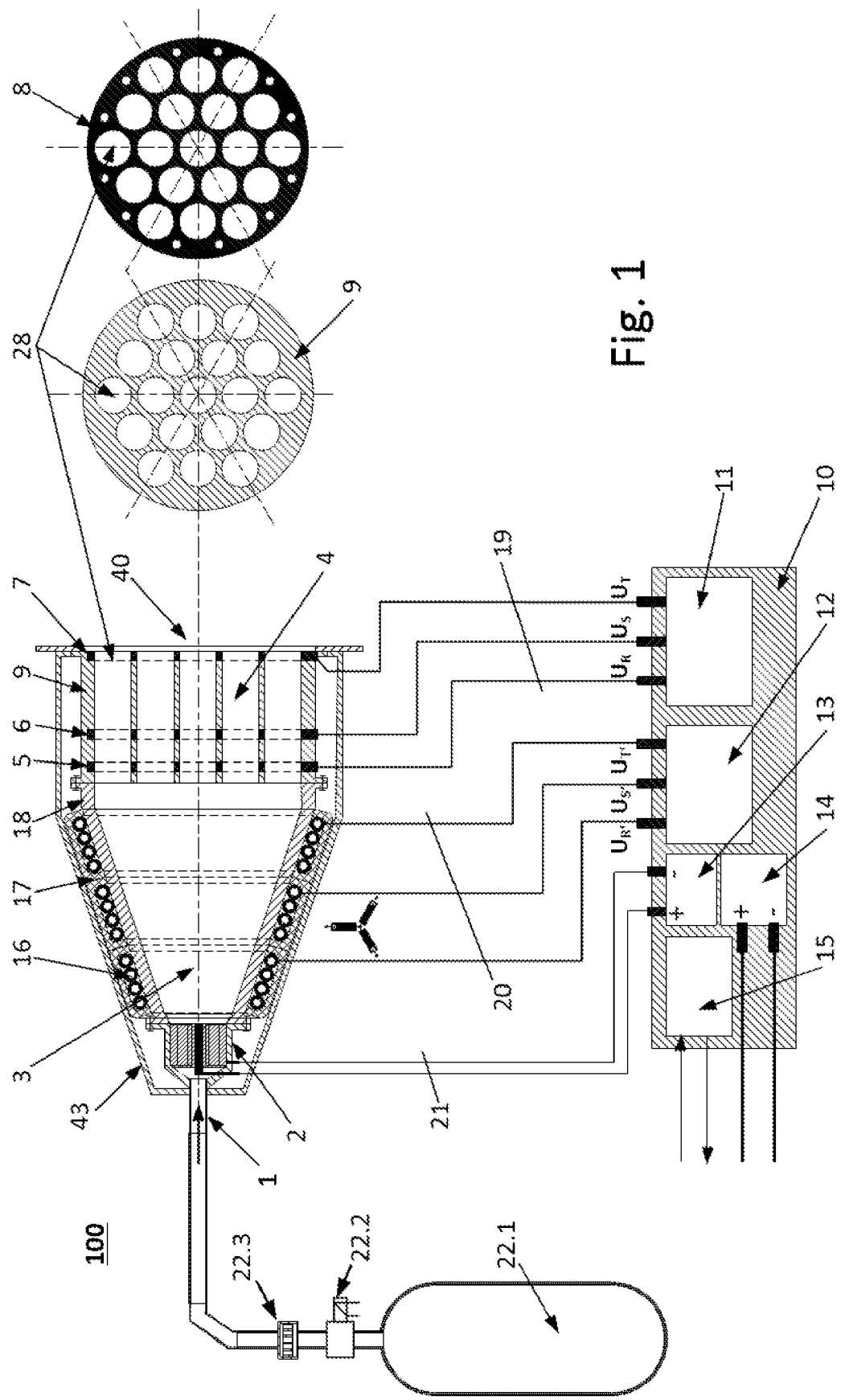
FIG. 1 shows a schematic of an ion thruster with corresponding electronics according to a special embodiment of the present invention.

Remark:

In order to develop the special formulas below for the determination of the distances between the acceleration grids and the frequency of the polyphase alternating current, by way of merely an example, the following formulas, definitions, constant factors and substitutions are used:

1) Standard Formulas and Definitions from the Physics:

| | |
|---|---|
| (1) $E = U/d_n$ | Estimation of a homogenous electrostatic field in Volts/meter acting across the plates of a Plate-Capacitor, where U is the Voltage in Volts and $d_n$ the distance of the plates in meters. |
| (2) $F = q * E$ | Estimation of the force, in Newtons, acting on an ion or electron within a homogenous electrostatic field, in Volts/meter, between the plates of a Plate-Capacitor and q is elementary charge of $1.6022E-19$ Ampere*seconds. |
| (3) $a = F/m$ | Acceleration, in meters/sec^2, of an ion or electron with their corresponding mass in kg and the electrostatic force acting on them in Newton. |
| (4) $d_{(n)} = \int_{x1}^{x2} a_{(t)} * t * dt$ | Estimation of the distance, in meters, when an ion or electron is accelerated, in metres/sec^2, within a time t, in seconds. |
| (5) $T = 1/f$ | Duration of the period of the polyphase alternating current in sec. |
| (6) $\lambda = v/f$ | Wave length ($\lambda$, in meters), between two ions pulses depending on their velocity (v, in meters/sec), and the frequency of the polyphase alternating current (f in Hz (1/sec)). |

2) Introduced Definitions in this Invention:

| | |
|---|---|
| (7) $d_{(n)} = \int_{x1}^{x2} a * C1_{(d1)} * t * dt$ | $C1(d_n)$ is a constant factor in order to compensate the acceleration, as the acceleration is not constant but it follows the applied electrostatic field generated by the polyphase alternating current. |
| (8) $C1_{(d1)}$ | The constant factor, mentioned in (7), is derived for the initial determination from the frequency formula by numerical simulations such as ion track when passing through the holes of the acceleration grids fulfils the needs for $C2(d_n)$, see formula (9). |

| | -continued |
|---|---|
| (9) $C2_{(dn)} = phi_{through}(d_n)/360°$ | Is a constant factor showing when an ion has to pass through a hole of an acceleration grid, such as at that moment the voltage on the grid becomes positive, e.g. on a 3-phase alternating current (=3 grids), $C2_{(d1)} = (120° + 10°)/360°$. +10° is because 120° corresponds exactly 1/3 of the phase "$U_R$" period ($T_R$), but we need a certain repel of the ions before passing through the hole of the second acceleration grid and $C2_{(d2)} = (240° + 10°)/360°$. +10° is because 240° corresponds exactly 2/3 of the phase "$U_R$" period ($T_R$), but we need a certain repel of the ions before passing through the hole of the third acceleration grid. |
| (10) etc. | for more than 3-phases of the alternating current |
| (11) $C3_{(d1)} = \dfrac{C1_{(d2)}}{C1_{(d1)}} * \left( \dfrac{C2^2_{(d2)}}{C2^2_{(d1)}} - 1 \right)$ | C3 is the constant for the calculation of the distances, e.g. $d2^2 - d1 * d2 - C3_{(d1)} * d1^2 = 0$ |
| (12) $f = \sqrt{x * U}$ | Used as a substitution for the development of the formula for the frequency, in Hz (1/sec), U is the voltage of the polyphase alternating current onto the plates of a Plate-Capacitor, in volts and x is factor which is further developed. |
| (13) $E_{RS} = \dfrac{UR - US}{d1} + \dfrac{UR - UT}{d1 + d2}$ | Is the combined homogenous electrostatic field between the first acceleration grid and second acceleration grid, in an apparatus with 3-phases alternating current (=3 acceleration grids). $U_R$ is the voltage of the first phase onto the first acceleration grid, $U_S$ is the voltage of the second phase onto the second acceleration grid and $U_T$ is voltage of the third phase onto the third acceleration grid and all in Volts and d1 is the distance between first acceleration grid and second acceleration grid and d2 is the distance between second acceleration grid and third acceleration grid all in meters. etc. for the other phases respectively acceleration grids and for more than three phases. |

FIG. 1 shows an ion thruster 100 according to a special embodiment of the present invention. Said ion thruster 100 can be called a Synchronous Polyphase Alternating Current (AC) of High Frequency High Voltage Electrostatic Ion-Thruster (SPACE-IT) which can be used for e. g. a spacecraft propulsion system or wherever an ion thruster is needed.

The ion thruster 100 comprises a pneumatic part and an electronics part 10 as shown in FIG. 1.

The pneumatic part comprises a propellant gas inlet port 1, an igniter 2, an ionization chamber 3 and an ion accelerator 4. The propellant gas inlet port 1 provides a hermetically sealed and electrically insulated interface to a pneumatical system providing propellant gas (e. g. high pressure propellant gas source (tank) 22.1, valve 22.2, reducer 22.3) and ends within the igniter 2 of the ionization chamber 3 with a diffuser, such as to have uniformly and jet-less distribution of the propellant gas within the igniter 2.

Figure 2:
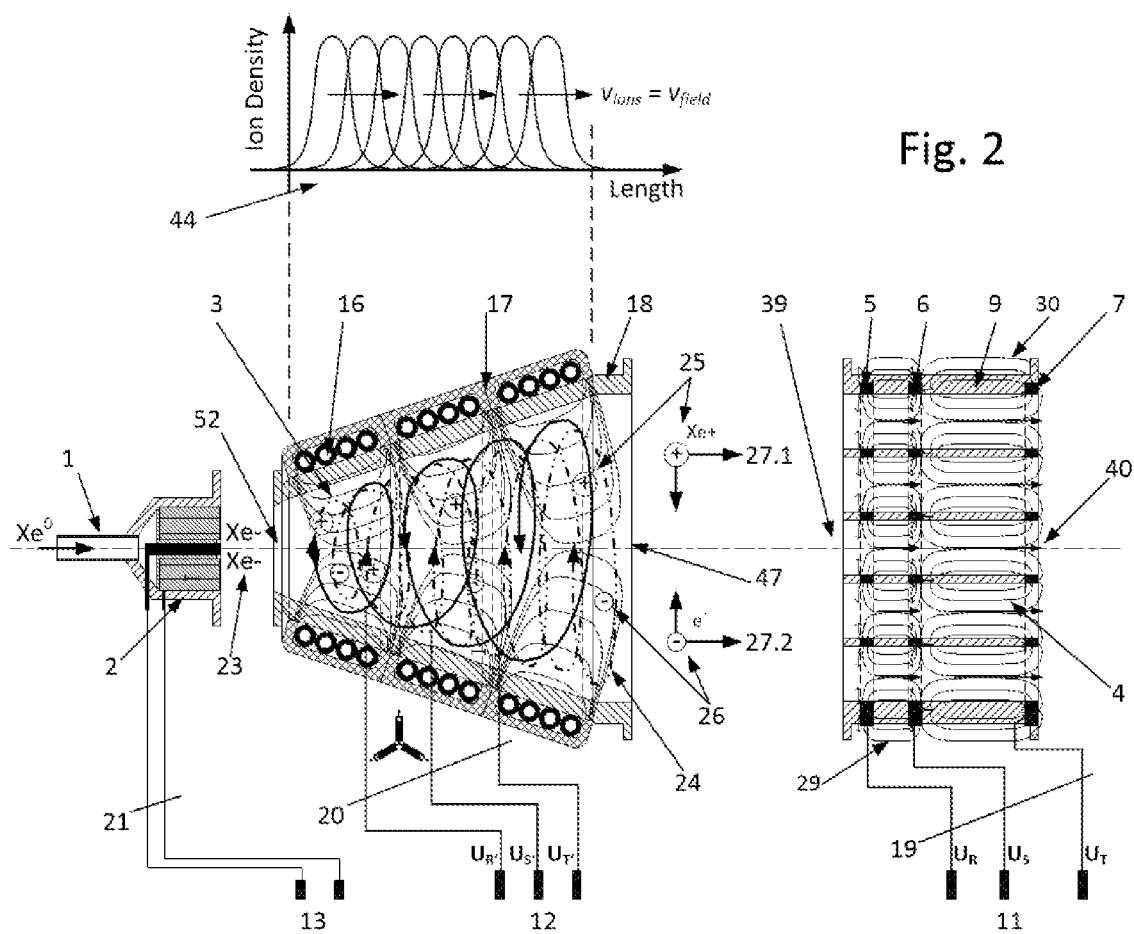
FIG. 2: shows by way of an example a flow schematic of an ionization igniter, an ionization chamber and an ion accelerator of the ion thruster of FIG. 1 shown in exploded view.

The igniter 2 comprises lamellae which are connected to high voltage direct current (DC) 21 of an ignition circuit 13, the electrostatic field established thereby generating certain negative ions 23 which are transported to the ionization chamber 3 inlet 52 by the nominal propellant gas flow (see also FIG. 2).

The ionization chamber 3 (see FIG. 2), which in this embodiment is shaped preferably conically for better distribution of the ionization gas, comprises a body 18, which is made of electrically insulated material and with less losses to the magnetic fluxes, such as e. g. ceramic or quartz glass, etc. in order to isolate electrically the ions and electrons from the housing 43 of the ion thruster 100.

This is necessary in order to avoid an assimilation of electrons 26, extracted from atoms of the propellant gas, by the housing 43 of the ion thruster 100. In this way, consequently, the ions 25 and electrons 26 are resting within the ionization chamber 3 so long, up to the time when they will be attracted by the linear traveling electrostatic field and accelerated towards the exit 40 of the ion thruster 100.

According to the present embodiment, in contrast to the already used Radio-Frequency ionization method, e.g. DE19948229 C1 to R. Killinger et al. or EP0560742 A1 to M. Gianfranco et al., the ionization is generated within the ionization chamber 3 by a linear traveling electromagnetic field 24, the direction of which is towards a first acceleration grid 5 in the inlet 39 of the ion accelerator 4.

The linear traveling electromagnetic field 24 enables an ionization process 44 along the whole length of the ionization chamber 3 (see FIG. 2) and not only in the core of the electromagnetic field. On the other hand, the alternating high frequency electromagnetic field mentioned in these patents forces the electrons and the new generated ions to move in a radial direction forward and backward not giving sufficient time for acceleration and so the gained velocity is moderate and so their kinetic energy in order to gain new ions by inelastic collision. Whereas according to the present invention, the electrons 26 respectively the new generated ions 25 are continuously accelerated in one direction and so achieve a very high velocity and so a very high kinetic energy, whereby inelastic collision with the fresh incoming propellant gas enable a very high gain of ions and electrons of theoretically 100%.

In this or an embodiment the linear traveling electromagnetic field 24 is generated by, but not limited to, 3-phases High Frequency (HF) coils 16 fed by a 3-phases high frequency alternating current 20 provided by a 3-phases High Frequency (HF) ionization power generating unit 12, the frequency of which could be in the range of e. g. 0.6 MHz to 2 MHz, but should be adapted to the frequency of the ion accelerator 4.

In order to enhance the electromagnetic field 24 and to eliminate a disturbing stray electromagnetic field, in this embodiment the HF coils 16 are covered by e. g. rings 17 of ferromagnetic material with very high electrical resistance and very low resistance to the magnetic fluxes, e.g. Ferrite, adequate for high power and high frequency, like those used in high frequency transformers. The electrical resistance can be for example greater than 10 MOhm. The resistance to the magnetic fluxes can mean a permeability of greater than for example 15000

As shown in FIG. 2, the rings 17 of the ferromagnetic material with each coil 16 of the three-phases alternating current (AC) form a three-phase system with which the linear travelling electromagnetic field 24 is established.

In this or an embodiment, the HF coils 16 are realized by enamelled copper wire. Because of the Skin-effect at high frequencies, where the electrical current tends to flow at the outer skin of the wire, the wire has to provide a big surface as possible. This can be realized either e. g. by a hollow wire with higher diameter than necessary in case of Direct Current (DC) or by e.g. twisting more wires of smaller diameter together, or other methods, and so increasing the effective surface. The reason of course is to reduce the mass of the copper wire for the wished current at this high frequency.

The ionization chamber 3 is connected to the body of the ion accelerator 4, preferably hermetically sealed and of course also electrically insulated as shown in FIG. 1.

In this or an embodiment, the ion accelerator 4 is driven by a polyphase high frequency Alternating Current (AC), preferably shaped like a sinus, rectangular or as other possible shapes. The number of acceleration grids 5, 6, 7 corresponds to the number of the electrical phases. Through simulations, an optimum configuration is deemed to be a 3-Phases Rectangular-shape Alternating Current (AC) of high Frequency with three acceleration grids. However, for example the shape can be different, e. g. a sinus.

Therefore, the description of special embodiments of the present invention, on one hand for better understanding its function and on the other hand for said optimum configuration, will be concentrated on an ion accelerator 4 comprising three acceleration grids 5, 6, 7 driven by a 3-Phases Rectangular-shape High Frequency (HF) Alternating Current (AC) 19, as shown in FIG. 1.

There are different ways to realize the ion accelerator 4. The ion accelerator 4 can preferable be realised by a full body 9, e.g. out of ceramic material, comprising the acceleration grids 5, 6, 7, where reference numeral 8 designates an example front face of an acceleration grid. As holes 28 can be for example drilled afterwards, the holes from acceleration grid to acceleration grid can be exactly straight and/or aligned (see FIG. 1), and by this, reduce manufacturing constraints as the tolerances are concerned.

In addition this configuration ensures that the track of the ions respectively electrons is within the holes which on one hand is supported by focusing 32, 37, 38 of the ions at the passage through the acceleration grids (see FIG. 4) and on the other hand the electrostatic field within the body is weakened by the relative permittivity ($\varepsilon_r$) of the material (e.g. ceramic: $6<\varepsilon_r<10$). Thus, the electrostatic field in the holes 28 is much stronger and as such improving the focusing 32, 37,38 of the ions respectively electrons mentioned above within the holes 28 of the acceleration grids 5, 6, 7.

Another way could be e. g. without full body 9, i.e. only the acceleration grids 5, 6, 7 which are then supported by the housing (43) of the ion thruster 100 electrically insulated by adequate material, e.g. ceramic.

By this configuration it must be kept in mind, that the manufacturing of the acceleration grids requires very small tolerances, because the holes from acceleration grid to acceleration grid should be really straight, and on the other hand the track of the ions could sometimes be not straight and could not be recovered by the focusing of the ions 32, 37, 38 and so, the ions, could perpendicularly hit the acceleration grid at a very high velocity resulting in an acceleration grid sputtering respectively acceleration grid degradation and generation of acceleration grid material deposits.

In contrast, by e. g. the full body 9 configuration mentioned above, this could also happen, but within the holes and so the ions could hit the ceramic body or the acceleration grid metal, but not perpendicularly to the surface but more or less diagonal to the surface and so it bounces away without losing too much of the kinetic energy and so reducing the risk of acceleration grid and/or body degradation.

The shape of the ion thruster 4 is selected here to be round, whereas other shapes are also acceptable. The number and the arrangement of the holes 28 of the acceleration grids 5, 6, 7 (seen FIG. 1) can be selected so as to maximize the number of holes with the given diameter of the ion accelerator 4, but still leaving enough acceleration grid material on one hand to generate the electrostatic field and on the other hand to have, structurally, sufficient remaining stiffness in case of not full body.

Preferably the number of holes 28 of an acceleration grid is symmetrically arranged on the surface/front face 8 of an acceleration grid, like e. g. 5, 6, 7, and/or preferably the same distances are kept between them (see FIG. 1). This results in: h(0)=1 hole, h(1)=1 hole, h(2)=7 holes, h(3)=19 holes, h(4)=37 holes, etc. where 0, 1, 2, . . . , n represents the holes-configuration under consideration.

Generally, the formula: h(n)=2*h(n−1)−h(n−2)+6, with n≥2 representing the holes-configuration number, can be used in order to successively calculate other grid-hole configurations.

For example, configuration n=4 results in: h(4)=2*h(3)−h(2)+6=2*19−7+6=37 holes, etc.

In this or an embodiment the acceleration grids 5, 6, 7, are of metallic material with very low electrical resistance (for example <10 milli-Ohm) and as thin as possible (for example 0.2 to 0.4 mm), but respecting the maximum expected electrical current and in case of the mentioned not fully body, the maximum expected mechanical loads. The material requirements for these acceleration grids are relaxed, hence a degradation of the acceleration grids due to sputtering of the acceleration grids is minimised or excluded in the mentioned full body configuration.

The ion track within an electrostatic field follows on one hand a square function over the time ($s(t)=s0+(½)*a*t^2$) and on the other hand the ions have to have pass through the second acceleration grid 6 shortly after the ⅓ of the period of the phase "$U_R$" on the first acceleration grid 5 and the third acceleration grid 7 shortly after ⅔ of the period of the phase "$U_R$" on the first acceleration grid 5.

Figure 4:
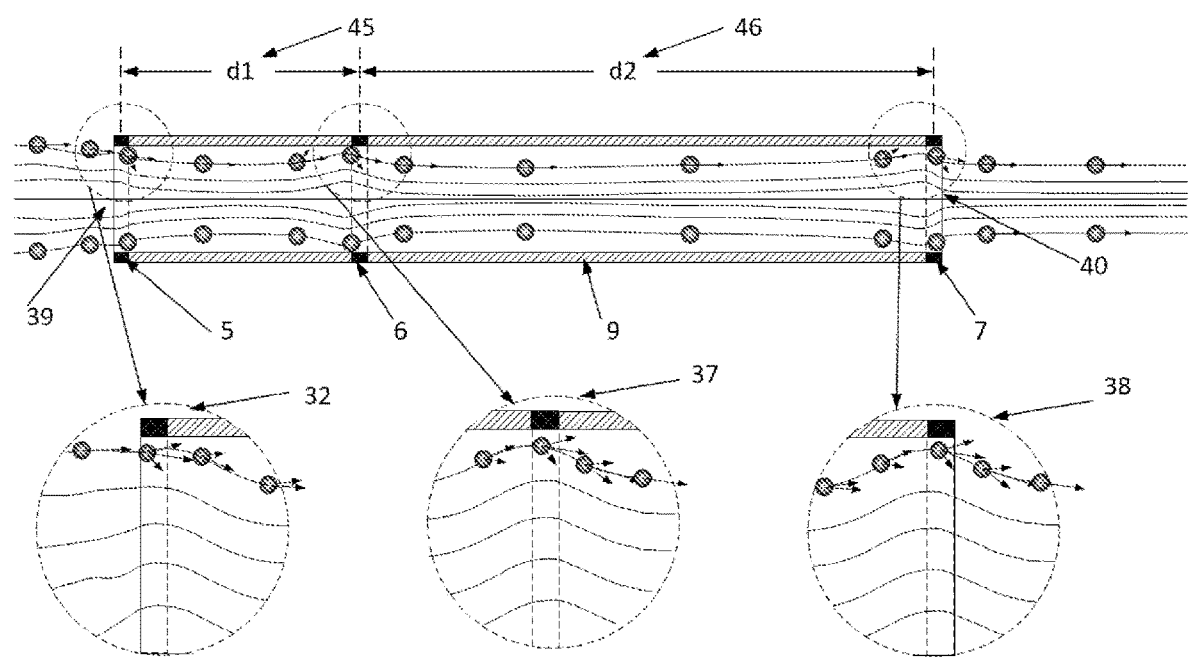
FIG. 4: shows byway of example an illustration of ion focusing (representatively) within one hole of the acceleration grids.

This definition is necessary such as the polarity of the applied polyphase Alternated Current (AC) must have been changed, i.e. from the negative to positive polarity before, so as the ions are slightly repelled 32, 37, 38 before passing through the holes 28 of the grids 5, 6, 7 respectively (see FIG. 4). On one hand this avoids an ion hitting onto the acceleration grids at a high velocity, resulting in said unwanted phenomena, and on the other hand, this improves also the focusing 32, 37, 38 of the ion current which increases the effectiveness of the ion accelerator 4. Of course, this repelling causes slightly a velocity reduction, but as it is very small it can be neglected.

As the velocity of the ions is very high, but the frequency remains constant, the ions would have passed already through the third acceleration grid 7 before the voltage becomes positive, if the distance 46 (d2), see FIG. 4, between the second acceleration grid 6 and the third acceleration grid 7 would be the same as the distance 45 (d1) between the first and second acceleration grids 5 and 6. Therefore, the distance 46 (d2) between the second acceleration grid 6 and the third acceleration grid 7, see FIG. 4, is greater than the distance 45 (d1) between the first acceleration grid 5 and second acceleration grid 6 and by this, the electrostatic force acting on the ions is less than the electrostatic force during the travelling from first acceleration grid 5 to second acceleration grid 6 and consequently the acceleration of the ions 25.

The distance between the acceleration grids depends on the applied voltage (driven by the performance requirements) and consequently a frequency adaptation has to be applied. That means, that for a given performance a dedicated voltage of the polyphase AC has to be applied with the corresponding frequency, see formula for the calculation of the frequency as shown below.

The minimum acceleration grid distance 45 (d1) between the first acceleration grid 5 and second acceleration grid 6 depends on the applied voltage respecting the spark breakdown voltage level for a given propellant gas (e.g. Xe or N2 or others) and pressure. The acceleration grid distances of the other acceleration grids (third, fourth, etc.) depend on the applied frequency and consequently, ion velocity which, in turn, means that the acceleration grid distances are successively increasing which can numerically be estimated as shown below.

The frequency of the polyphase AC has to exactly be set as calculated using the formula shown below, i.e. not too fast (>30%) and not too slow (<20%), hence both conditions results in to performance degradation respectively acceleration grid damages if the ions are hitting the acceleration grid at high velocity and as such resulting in the so-called sputtering of the acceleration grid which in turn, results in to degradation of the acceleration grid life or even worse in to an electrically shortage of the acceleration grids by deposits of acceleration grid material and so resulting in accelerator malfunction, i.e. same problems as in a DC-Ion-Thrusters.

The distances between the acceleration grids can numerically be estimated using the equations shown below. Nevertheless, the number of equations needed correspond to $N_{Grids}-1$ (Number of acceleration grids-1). This is because d1 (45), i.e. distance between first acceleration grid 5 and second acceleration grid 6, is known and it is the smallest distance among the others and as such is used as input for the determination of the maximum allowable voltage of the polyphase alternating current respecting the spark breakdown voltage for a given propellant gas (e.g. Xe or N2, etc.) and pressure respectively for the determination of the desired electrostatic field, i.e. E=U/d.

For a three acceleration grids configuration:
d1 is known $$d2^2 - d1*d2 - 3.3127*d1^2 = 0$$

For a six acceleration grids configuration:
d1 is known $$d2^2 - d1*d2 - 3{,}6506*d1^2 = 0$$

$$d3^2 - d2*d3 - 0{,}6230*d2^2 = 0$$

$$d4^2 - d3*d4 - 0{,}2071*d3^2 = 0$$

$$d5^2 - d4*d5 - 0{,}1194*d4^2 = 0$$

The constant factors are derived from ion passage through the acceleration grids, e. g. for 3-phases at >⅓ and >⅔ of the phase "$U_R$" period or for 6-phases at >⅙, >2/6, >3/6, >4/6 and >⅚ of the phase "$U_R$" period in order to have a positive voltage on the corresponding acceleration grid when the ions are approaching respectively passing through the acceleration grids, combined with the correction factor for the ion acceleration along each distance, as the ion acceleration is not constant because it follows the voltages of the polyphase alternating current. Nevertheless, making afterwards a relation like dn/d1 (n=number of grid), enables the calculation for different d1 values, without going the way again of numerically solving using the above equations.

As the thickness of the acceleration grids 5, 6, 7 is not negligible, the mentioned distances, like d1 (45) and d2 (46), are considered to be from the middle to the middle of the acceleration grid thickness, see FIG. 4. This fact of course has to be considered by the definition of the effective distance between the acceleration grids for the determination of the maximum Voltage (respecting the spark breakdown voltage level) and of the electrostatic field ($E=U/d_{effective}$).

Of course, the distances between the acceleration grids can be set to the same length, but then the voltages to the acceleration grids have to be adequately adapted, because the frequency remains constant, i.e. if d1<d2<d3< ... <dn then $U_{d1}=U_{d2}=U_{d3}= \ldots =U_{dn}$ whereas if d1=d2=d3= ... =dn then $U_{d1}>U_{d2}>U_{d3}> \ldots >U_{dn}$. This is more constraint to the electronics than the constraints to the body 9 of the ion accelerator 4 having acceleration grids with different distances.

The ion accelerator 4, in this embodiment (see FIG. 1), is fed with three phases (see acceleration power generating unit 11 and alternating current 19 in FIG. 1) named as, "$U_R$" (first phase), "$U_S$" (second phase) and "$U_T$" (third phase) both connected to the first acceleration grid 5, second acceleration grid 6 and third acceleration grid 7 respectively.

In this case the symmetrical phase shift between the phases is 120°=360°/3-phases. That means that the second phase "$U_S$" has a phase shift of 120° from the first phase "$U_R$" and the third phase "$U_T$" has a phase shift of 120° from the second phase "$U_S$" respectively 240° from the first phase "$U_R$". This relation is shown above for the determination of the acceleration grid distance.

Certainly, more than three phases can be used, as mentioned in this application, but then the phase shift of course is shorter (360°/number of phases), e.g. in case of six phases the phase shift is then 360°/6-phases=60° and the number of the acceleration grids corresponds of course to the number of the phases.

As the phase shift with six phases is half of the phase shift with three phases, the jump from phase to phase is shorter. Therefore, the frequency for six phases is lower than the frequency with three phases, etc.

For better imaging the improvement potential by increasing the number of the acceleration grids and the corresponding number of the phases, the Table below provides an example of a simulation of, but not limited to, an ion thruster of 10 mN (thrust force) using Xenon (Xe) as propellant, driven by DC (corresponding to the prior art), and 3-, 6-and 12-phases AC for comparison.

| 10 mN Xe Ion-Thruster driven by: | | | | |
|---|---|---|---|---|
| Voltage type | DC voltage | 3-phases AC | 6-phases AC | 12-phases AC |
| Ion Velocity @ Exit | 1 | ≅2 | ≅4 | ≅8 |
| Mass flow rates | 1 | ≅½ | ≅¼ | ≅⅛ |
| Isp | 1 | ≅2 | ≅4 | ≅8 |
| Propellant Mass | 1 | 1 | 1 | 1 |
| Total Impulse | 1 | ≅2 | ≅4 | ≅8 |
| Electrical Power | 1 | ≅½ | ≅¾ | ≅⁶/₅ |
| Length (Ion accelerator) | 1 | ≅3 | ≅15 | ≅50 |
| Frequency | N/A | 1 | ¹/₄₂₉₃ | ⅓ |

The major contribution resulting to this high improvement is that the electrostatic field 29, 30, 31, 48, 49, 50 on a 3-phases ion-thruster follows the formula for calculation of the electrostatic field across a plate capacitor as: E=U/d, where U is the voltage between the plates and d is their distance, e.g. between first acceleration grid 5 and second acceleration grid 6, to $E_{RS}=[(U_R-U_S)/d1]+[(U_R-U_T)/(d1+d2)]$, see FIG. 3, whereas on a 6-phases to $E_{RS}=[(U_R-U_S)/d1]+[(U_R-U_T)/(d1+d2)]+[(U_R-U_U)/(d1+d2+d3)]+[(U_R-U_V)/(d1+d2+d3+d4)]+[(U_R-U_W)/(d1+d2+d3+d4+d5)]$, etc. for the other phases or for a 12 acceleration grids ion thruster, etc. where d is the distance between the acceleration grids, E is the electrostatic field and U is the applied voltage of each phase. This fact results in that the value of the combined linear travelling electrostatic field is increasing by increasing the number of acceleration grids and consequently the force acting on the ions and so their acceleration.

Concerning the shape of the alternating current, of course also other shapes (like sinus, triangle or trapezoid, etc.) can be used in this invention, but through simulations it has been shown that with a simple rectangular shaped alternating current especially good results can be achieved and certainly with a simple design and less constraints to the electronics.

In this or an embodiment the three phases of high voltage high frequency alternating current with a phase-shift of 120° between them is realised by a double-H-bridge of six high voltage, high power and high frequency MOSFET's, whereas also other architectures are possible within this invention.

Because of the simple rectangular shape alternating current, the MOSFET's are used as pure switches, i.e. ON or OFF. By this, the polyphase rectangular alternating current can be generated digitally by a controller (e. g. 15). This simplifies the drive electronics on one hand and on the other hand the power loss of the MOSFET's is negligible.

Figure 6:
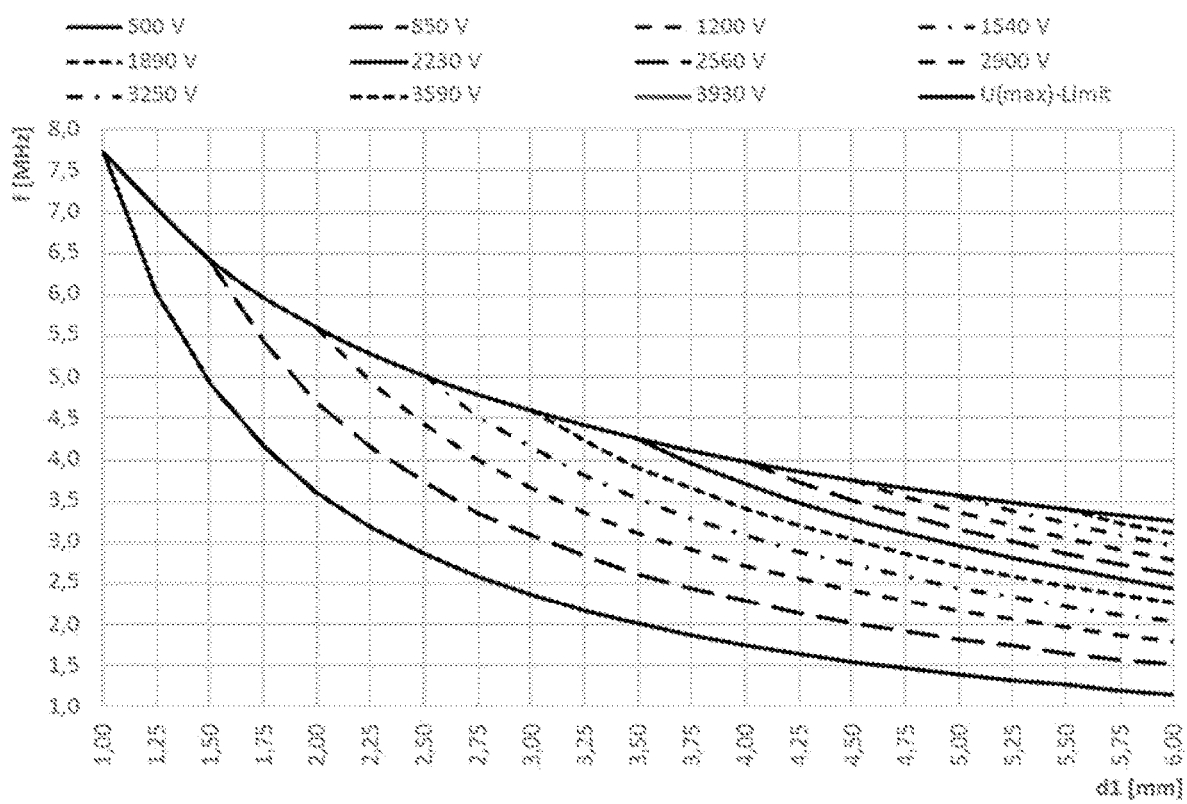
FIG. 6: shows by way of example frequency over acceleration grid distance d1 for 3-phases AC using Xenon (Xe) as propellant gas.
Figure 7:
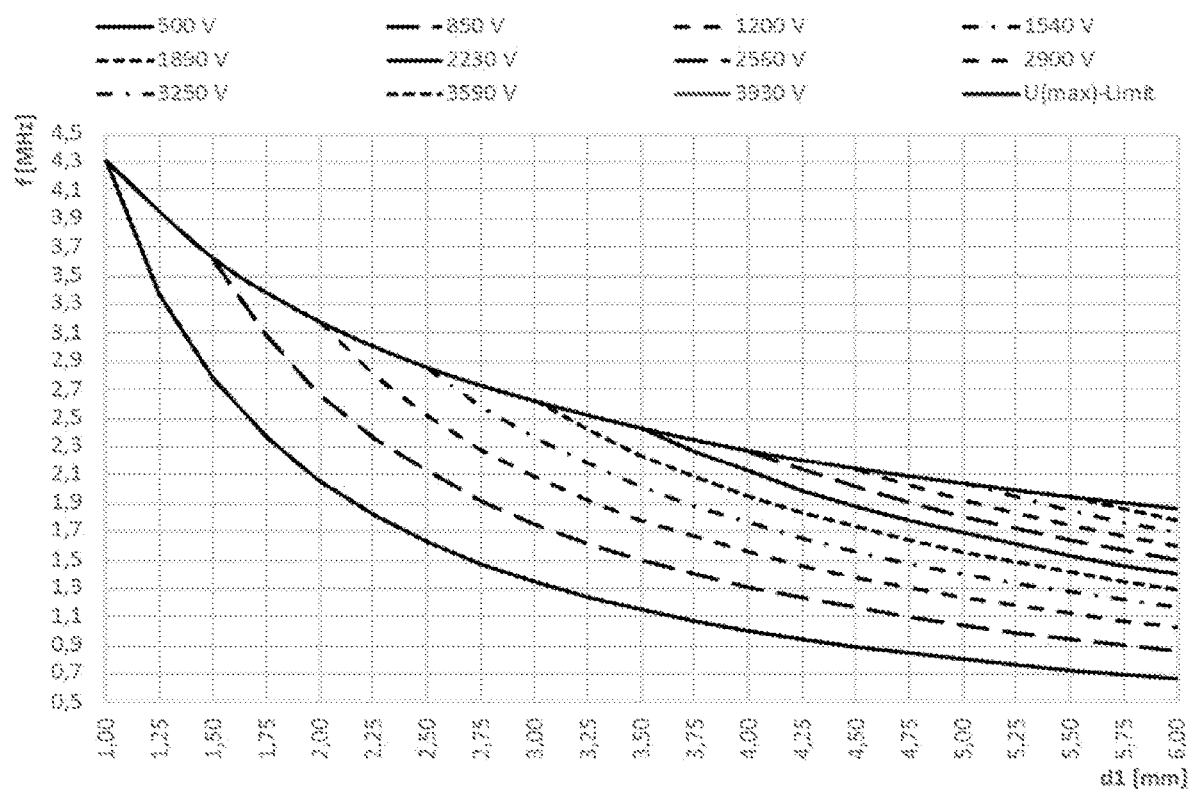
FIG. 7: shows by way of example frequency over acceleration grid distance d1 for 6-phases AC using Xenon (Xe) as propellant gas.

The frequency of the polyphase alternating current, which establishes the linear traveling electrostatic field, depends strongly on the ion velocity, in turn, which depends on the applied voltage and acceleration grid distances, the used ionized gas (propellant gas) (e.g. Xe or N2, etc.) and the ion track through the acceleration grids respecting the timing of the ion passage through the acceleration grids. It can be taken from FIG. 6 for 3-phases or FIG. 7 for 6-phases, if using Xenon (Xe) as propellant gas, or accurately be estimated also for different propellant gases using the equation:

$$f=\sqrt{C1_{(d1)}*C2_{(d1)}^2*q*U_R/(m*d1^2)}$$

where q is the elementary charge 1,6022E-19 in A*s, U is the voltage in Volts, m is the atom mass of the used gas in kg (e.g. Xe=2,196E-25 kg, or N=2,34167E-26 kg, etc.) and d1 (45), i.e. distance between first acceleration grid 5 and second acceleration grid 6, in meters.

Figure 8:
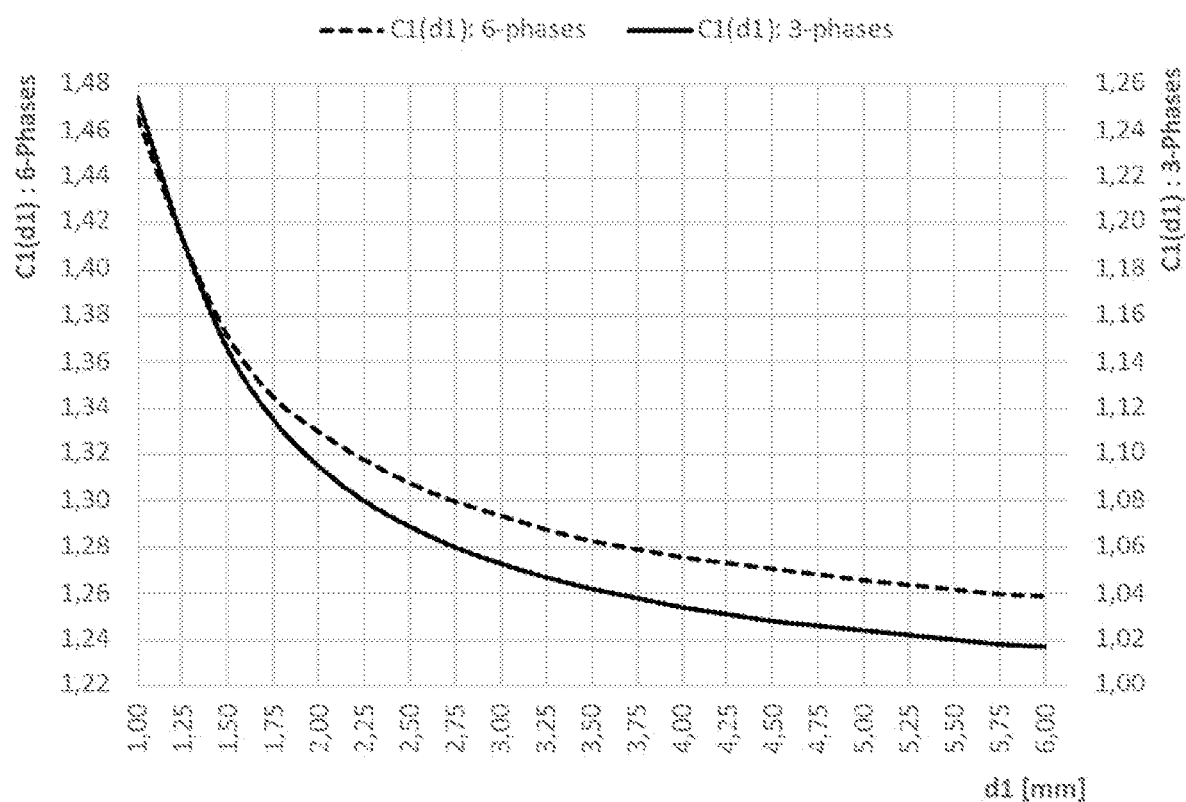
FIG. 8: shows by way of example a constant factor for frequency estimation over a distance (d1) between a first grid and a second grid for rectangular shape polyphase AC.
Figure 9:
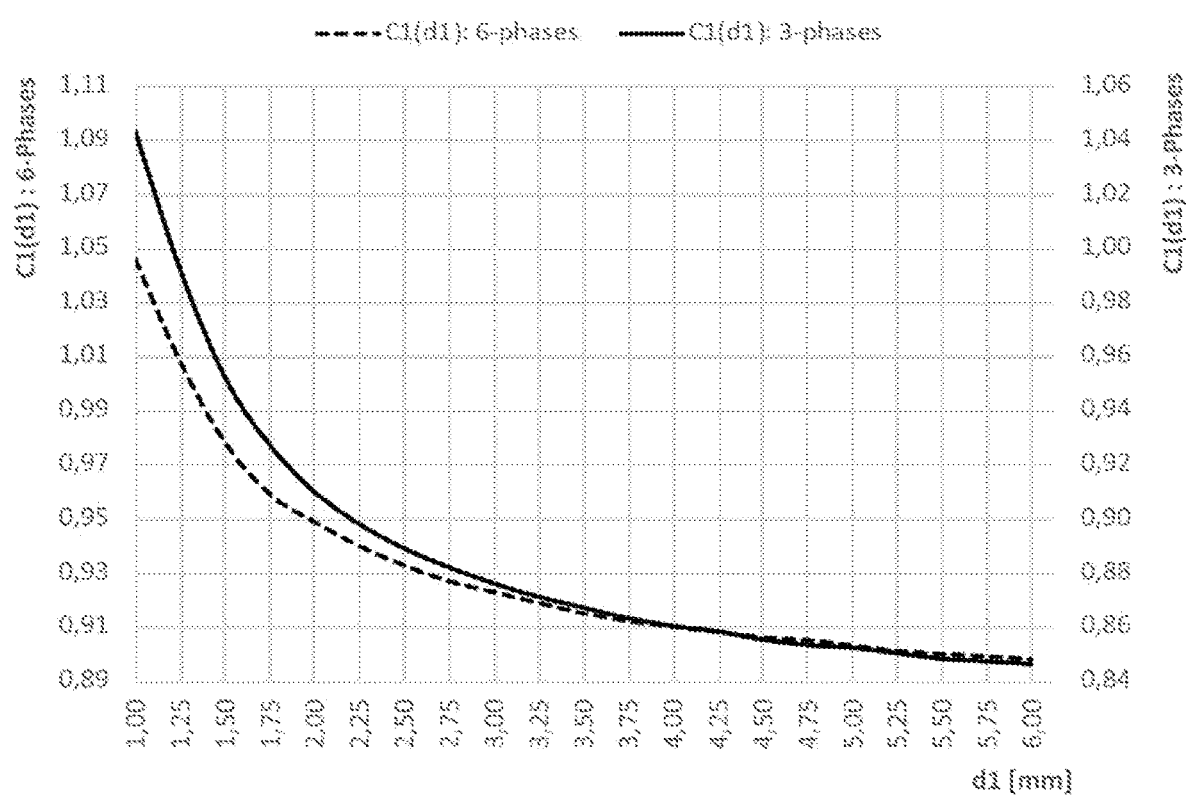
FIG. 9: shows by way of example a constant factor for frequency estimation over a distance (d1) between a first grid and a second grid for sinus shape polyphase AC.

The factors $C1_{(d1)}$ and $C2_{(d1)}$ depend on the number of the phases of the alternating current and consequently on the number of acceleration grids and on the distance d1 (45). The factor $C1_{(d1)}$ can be taken from FIG. 8 for 3- or 6-phases rectangular shape alternating current or FIG. 9 for 3- or 6-phases sinus shape alternating current. The factor $C2_{(d1)}$ is derived from the relation of ion passage through the second grid (6) and lasts for 3-phases to $C2_{(d1)}=3*((120°+10°)/360°)=1,0833/3$, because the phase shift here is 360°/3-phases=120° and so the passage shall be shortly after ⅓ (i.e. +10°) of the first phase "$U_R$" on first acceleration grid 5 whereas for 6-phases lasts to $C2_{(d1)}=6*((60°+7°)/360°)=1,117/6$, as the phase shift here is 360°/6-phases=60° and so the passage shall be shortly after ⅙ (i.e. +7°) of the first phase "$U_R$" on first acceleration grid 5.

By comparing the frequencies of 3-, 6- and 12-phases the relation lasts to $f_{(3\text{-}phases)}=\sqrt{3}\ f_{(6\text{-}phases)}=3*f_{(12\text{-}phases)}$, etc. for more phases, see Table above.

If the frequency of the applied alternating current is set too high (e.g. 30% higher than the frequency calculated with the equation mentioned above), then the created linear traveling electrostatic field is too fast for the accelerated ions to follow synchronously the linear traveling electrostatic field, hence the frequency and the acceleration of the ions depend directly on the applied voltage, distance of the acceleration grids and the mass of the ions. Thus, it results in performance degradation and in the worst case (>400%), no thrust can be generated.

On the other hand, if the frequency of the applied alternating current is set too low (e.g. 20% lower than the frequency calculated with equation mentioned above), then the created linear traveling electrostatic field is too slow for the accelerated ions to follow synchronously the linear traveling electrostatic field and so, in the worst case, despite of the performance degradation, the ions are hitting the acceleration grids at very high velocity as the polarity of the phase connected to that acceleration grid is still negative, i.e. same problem as for the DC ion thrusters. Therefore, generally, to avoid an ion hitting the acceleration grids at high velocity, resulting in the said unwanted phenomena, respectively performance degradation, the frequency shall be adapted, see above, such that when the ions are approaching the next acceleration grid, the polarity of the applied polyphase Alternated Current (AC) on that acceleration grid must have been changed, i.e. from the negative to positive polarity before, so as the ions are slightly repelled 32, 37, 38 on FIG. 4, before passing through, avoiding hitting the acceleration grid at very high velocities.

In this or an embodiment, the high voltage to feed the high frequency double-H-bridge generating the polyphase high voltage high frequency alternating current is generated by a double-H-bridge of six low voltage, high power MOSFET's. The three phases of low voltage rectangular shape alternating current with a frequency around 45 KHz to 75 KHz, is connected to the high frequency transformers.

The star connection at the output of the transformers has the advantage that the generated high voltage is around √3 higher than for one phase and by this the transformers need less windings on the secondary coils.

The generated alternating current on the secondary coils of the transformers are connected to a bridge of six high voltage, high frequency and high-power rectifier-diodes. The ripple of the rectified current is smoothed with the filter realised by two high voltage capacitors and one inductance.

Because of the simple rectangular shape alternating current, the MOSFET's are used as pure switches, i.e. ON or OFF. By this, the three phases rectangular alternating current is digitally generated by the controller 15. This simplifies the drive electronics on one hand and on the hand the power loss of the MOSFET's is negligible.

As, according to an embodiment of the present invention, it is possible to set different thrust levels by variation of the high voltage polyphase alternating current, the controller 15 is sensing continuously the high voltage level and sets automatically the corresponding frequency.

On the other hand, according to an embodiment of the invention, it is also possible to set different thrust levels by variation of the frequency by the controller 15, but then the high voltage has to be set to the corresponding value using the formula for the frequency calculation shown above.

Of course, the thrust level can also be increased e. g. by increasing the mass flow rates, but that is a design change by increasing the number of holes 28 of the acceleration grids and as such allow higher mass flow rates and of course increasing the necessary electrical power.

Functional Description of an embodiment of the synchronous polyphase AC electrostatic ion thruster (SPACE-IT):

To start the ionization, the igniter 2 is fed with high voltage direct current (DC) 21 through the ignition circuit 13 and so establishes an electrostatic field which can generate certain negative ions 23 which are then transported to the ionization chamber 3 inlet 52 by the nominal propellant gas flow.

These negatively charged ions 23 with the influence of the linear traveling electromagnetic field 24 are forced to rotate 25 radially to the axis of the ionization chamber 3 and of course following the linear traveling electromagnetic field towards to the exit 47 of the ionization chamber 3 respectively to the inlet 39 of the ion accelerator 4. These negatively charged ions collide with other incoming propellant gas atoms at a high velocity and by an inelastic collisions remove an electron and so ionizing the propellant gas respectively and gain free electrons for the further ionization process.

These free electrons 26 and the new generated ions 25 are continuously counter-rotating radially along the axis of the ionization chamber 3 and so initiates a chain reaction producing self-sustaining ions and electrons and so on. The axial velocity of the ions 27.1 and electrons 27.2 towards to the exit 47 of the ionization chamber 3, i.e. to the first acceleration grid 5 of the ion accelerator 4 corresponds to the velocity of the linear traveling electromagnetic field, which, in turn, depends on the frequency of the applied voltage 20.

After the successful ignition of the ion plasma 27.1 the igniter 2 may be switched off, in order to save electrical power as its function is no longer needed.

Figure 3:
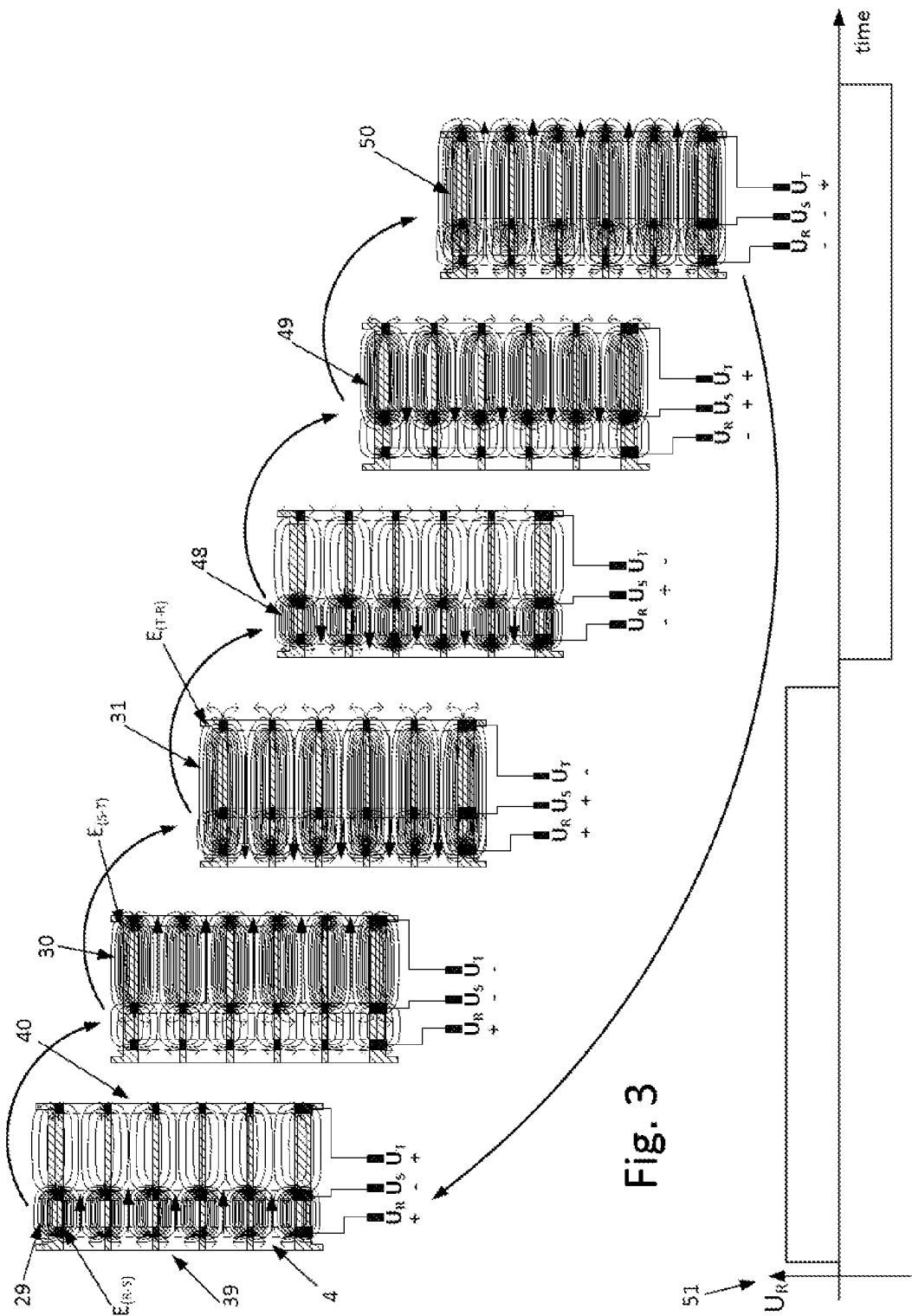
FIG. 3: shows by way of example a schematic of a linear traveling electrostatic field established by a polyphase alternating current for one complete phase cycle.

As soon as the acceleration grids 5, 6, 7 are powered with the polyphase Alternating Current (AC), a linear travelling electrostatic field is established across the acceleration grids 5, 6, 7 to which the ions respectively electrons tend to, synchronously, follow (see linear traveling electrostatic fields 29, 30, 31, 48, 49, 50 in FIG. 3).

The first acceleration grid 5, nevertheless, acts always as a gate which is open for the ions 25 in the negative half-wave of the phase "$U_R$", whereas for the electrons 26 the gate opens in the positive half-wave, i.e. a shift of 180°.

In the negative wave of the phase "$U_R$" onto the first acceleration grid 5, the ions 25 are captured and are waiting for the positive half-wave, but the electrons are kept away. As soon as the phase "$U_R$" 51 is changing its polarity from negative to positive value, whereas the voltage of the phase "$U_S$", connected to the second grid 6, has already the negative value (shift by 120°), thus the established linear traveling electrostatic field 29, 30 has a direction towards to the second acceleration grid 6 and by this the ions 25 are accelerated from the first acceleration grid 5 towards to the second acceleration grid 6. As the frequency and acceleration grid distances are adapted such as when the ions are approaching the second acceleration grid 6, the polarity of the voltage of the phase "$U_S$" become positive, whereas the voltage of the phase "$U_T$", connected to the third grid 7, has already negative level 31 and by this, the established linear traveling electrostatic field (30) has a direction from second acceleration grid 6 towards to the third acceleration grid 7 (31).

As the polarity of the phase "$U_S$", i.e. of the second acceleration grid 6, has now a positive value 31 before the ions are passing through the holes 28 of the acceleration grid 6, i.e. shortly after the ⅓ of the period of phase "$U_R$", the ions are repelled 37 by the second acceleration grid 6. The resulting forces acting on the ions pushes the ions through the hole 28 of the acceleration grid, but without hitting or touching the acceleration grid, as shown in FIG. 4.

As soon as the ions are through the holes 28 of the second acceleration grid 6, and as said above, the phase "$U_S$" has a positive potential, the ions are repelled away from the second grid 6 towards to the third grid 7 where the phase "$U_T$" is connected to, which in this moment has a negative potential 48 and so attracts the ions, i.e. the linear traveling electrostatic field has the direction towards to the third acceleration grid 7, i.e. towards to the exit 40 of the ion thruster 100.

Now, as soon as the ions are approaching the third acceleration grid 7 where the phase "$U_T$" is connected to, the phase is changing its polarity from negative to positive value 49 before the ions are passing through the holes 28 of the third acceleration grid 7, i.e. shortly after the ⅔ of the phase period "$U_R$" of the first acceleration grid 5, i.e. shift by 240°, and so the ions are repelled 38 by the acceleration grid 7. The resulting forces acting now on the ions pushes the ions through the holes of the acceleration grid but without hitting or touching the acceleration grid (see FIG. 4).

As soon as the ions are passing through the third acceleration grid 7, they are forth accelerated 38 still at a certain distance from the exit 40 of the ion accelerator 4, i.e. from the third acceleration grid 7 and so contributes to the improvement of the performance of the ion accelerator 4 (see FIG. 4). This happens, hence the voltage of the last acceleration grid (third acceleration grid 7), before the ions are passing through, has changed the polarity, from negative to positive value 49, whereas the voltage of second acceleration grid 6 has already positive value and so, the ions are massively repelled 38 away from the ion thruster 100 respectively spacecraft (see FIG. 4).

By this, the ions receive an additional acceleration and the velocity of the ions is slightly increasing, in contrast to a DC ion-thruster on which the ions are attracted back by the exit grid and consequently, de-accelerated.

This process has to be applied successively to the other acceleration grids, if decided to use configurations with more than three phases i.e. more than three acceleration grids.

By way of the present invention, hence the electrons 26 which are gained from the same Ions mentioned above will not be absorbed by the ionization chamber 3, they are waiting within the ionization chamber 3 up to the time when they will be attracted by the linear traveling electrostatic field and captured by the first acceleration grid 5 when the voltage of the phase "$U_R$" has a positive value 29, whereas the ions are kept away. As soon as the phase "$U_R$" changes the polarity from positive to negative value 48, whereas at the same time the voltage of the phase "$U_S$" has a positive value (i.e. shift by 120°) and as such the linear traveling electrostatic field 31 has a direction towards to the second acceleration grid 6 (48) and so the electrons are following the electrostatic field towards to the second acceleration grid 6.

As the acceleration of the electrons is much higher than the acceleration of the ions, but the frequency is adjusted for the ions, the electrons are reaching the second acceleration grid 6 when the acceleration grid has still positive value 49 and in fact the electrons are captured now from the second acceleration grid 6 up to the time when the voltage is changing its polarity from positive value to the negative one 50.

When the voltage of the second acceleration grid 6 changes the polarity from positive to negative 50, the phase "$U_T$" of the third acceleration grid 7 has already a positive value 50 (i.e. shift by 120°) and as such the linear traveling electrostatic Field 49 towards to the third acceleration grid 7 is established 50.

Thus, the electrons are accelerated towards the third acceleration grid 7. As said before, as the acceleration of the electrons is much higher than that from the ions, but the frequency remains constant, the electrons are reaching the third acceleration grid 7 much earlier than the voltage of the phase "$U_T$" on the third acceleration grid has changed its polarity from positive to negative value.

Therefore, the electrons are captured now by the third acceleration grid 7 and waiting there up to the moment when the phase "$U_T$" is changing its polarity from positive to negative 30. When the phase "$U_T$" is changing its polarity from positive to negative value 30, the phase "$U_S$" has already a negative value 30 and so the electrons are accelerated away from the exit 40 of the ion thruster 100 and not back to the second acceleration grid 6, etc.

Figure 5:
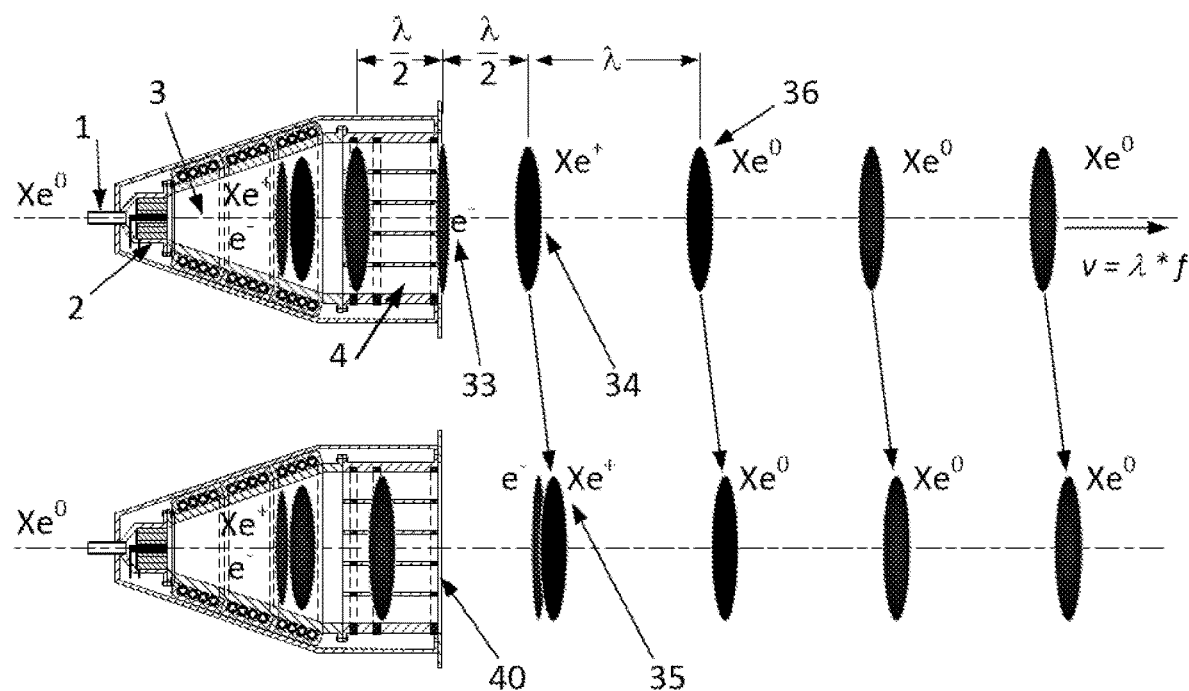
FIG. 5: shows by way of example an illustration of pulsed ion plasma and its neutralization.

As the ions and electrons are accelerated towards to the exit 40 in the corresponding half wave of the polyphase alternating current, i.e. by a shift of 180°, this will result in that the ion plasma 27.1 leaving the ion thruster is not continuous, like on a DC-ion thruster, but rather than pulsed (see pulsed beams 34, 35, 36 in FIG. 5), in a frequency equal to the frequency of the polyphase alternating current.

The distance between them 34, 36 corresponds to the wavelength which is equal to velocity divided by the Frequency, i.e. $\lambda=v/f$, which is roughly twice longer than the length of the ion accelerator 4 itself, if the frequency is set correctly, compare distance between the first acceleration grid 5 and third acceleration grid 7 with the wave length.

As said, the velocity of the electrons is much higher than the velocity of the ions, even the electrons are accelerated in the next half wave of the alternating current 33, i.e. by a shift of 180°, they will reach the ions at a distance from the exit 40 of the ion thruster 100 shortly after $\lambda/2$ of the ion wave at position 35 (see FIG. 5), and so neutralize them. Thus, a separate neutralizer function, compared to a DC-ion thrusters, is not necessary.

Further aspects of the invention:

1. An apparatus (100) presenting an Electrostatic Ion-Thruster/-Accelerator driven by a Synchronous Polyphase Alternating Current (SPAC) of High Frequency and High Voltage (11, 19) which generates a linear Travelling Electrostatic Field (29, 30, 31, 48, 49, 50) across the Grids (5, 6, 7) to which the Ions or Electrons tend to, synchronously, follow. Thus, this apparatus can be used as an Electrostatic Ion-Thruster, (SPACE-IT), for a spacecraft propulsion system or wherever an Ion-Accelerator is questioned, for example surface treatment.

2. The apparatus of aspect 1 comprising, but not limited to, three metallic low electrical resistance (for example <10 milli-Ohm) acceleration grids (5, 6, 7) which are connected to each phase of the High Frequency High Voltage Alternating Current (AC), in this example three phases (11, 19). The Grids should be as thin as possible, but respecting the maximum expected electrical current. The three phases may have symmetrically a phase-shift between each other of 120°=360°/3-phases and named, e.g. as "$U_R$" for the first phase, "$U_S$" for the second phase and "$U_T$" for the third phase. If, e.g., 6 phases are used then the phase shift is 60°=360°/6-phases, etc. In this way, a linear Travelling Electrostatic Field (29, 30, 31, 48, 49, 50) across the Accelerator Grids (5, 6, 7) is established, the velocity of which corresponds to the frequency of the Polyphase Alternating Current. The phase-sequence of the Polyphase Alternating Current (AC) may be set such as the direction of the linear Travelling Electrostatic Field is towards to the exit of the apparatus (40). The Ions (25) or Electrons (26) are captured by the first Grid (5) and then accelerated, synchronously following the linear Travelling Electrostatic Field, across the Grids (5, 6, 7) towards to the exit (40). The electrostatic force acting on the Ions respectively Electrons may follow the law $F=q*E$, where q is the elementary charge and E is the combined electrostatic field generated by the polyphase alternating current, i.e. on a 3-Phases Ion-Thruster follows the law, e.g. between first Grid (5) and second Grid (6), to $E_{RS}=[(U_R-U_S)/d1]+[(U_R-U_T)/(d1+d2)]$, whereas on a 6-phases to $E_{RS}=[(U_R-U_S)/d1]+[(U_R-U_T)/(d1+d2)]+[(U_R-U_U)/(d1+d2+d3)]+[(U_R-U_V)/(d1+d2+d3+d4)]+[(U_R-U_W)/(d1+d2+d3+d4+d5)]$ and so on for the other phases, where d is the distance between the Grids (45, 46) and U is the applied Voltage of each phase. This fact results that, the value of the combined linear Travelling Electrostatic Field (29, 30, 31, 48, 49, 50) is increasing by increasing the number of Grids and consequently the force acting on the Ions and so their acceleration.

3. The distance between the Grids (5, 6, 7) of aspect 2 may successively increase such that the requirements of aspect 2 are respected. Because the distance (d1) (45) between the first Grid (5) and second Grid (6) is then the smallest one, is the driver for the determination of the maximum voltage of the alternating current, respecting the spark breakdown voltage level for a given distance, propellant gas and pressure and for the determination of the wished Electrostatic field i.a.w. $E=U/d$. The following equations have to numerically be solved in order to determine the distances between the other Grids:

For three Grids configuration:
d1 is known $$d2^2 - d1*d2 - 3.3127*d1^2 = 0$$

For six-Grids configuration:
d1 is known $$d2^2 - d1*d2 - 3,6506*d1^2 = 0$$

$$d3^2 - d2*d3 - 0,6230*d2^2 = 0$$

$$d4^2 - d3*d4 - 0,2071*d3^2 = 0$$

$$d5^2 - d4*d5 - 0,1194*d4^2 = 0$$

The constant factors may be derived from Ion passage through the Grids i.e. for 3-phases at $3*((120°+10)/360°) = 1,0833/3$ $T_R$ and at $3*((240°+10°)/360°) = 2,0833/3$ $T_R$ and for 6-phase at $6*((60°+7°)/360°) = 1,117/6$ $T_R$, $2,117/6$ $T_R$, $3,117/6$ $T_R$, $4,117/6$ $T_R$ and at $5,117/6$ $T_R$, ($T_R$=period of first phase "$U_R$" 51), in order to have a positive voltage on the corresponding Grid when the Ions are approaching respectively passing through the Grids (32, 37, 38), combined with the correction factor for the Ion acceleration along each distance, as the Ion acceleration is not constant as it follows the voltages of the polyphase alternating current.

Nevertheless, making afterwards a relation like dn/d1, (n=number of grid) enables the calculation for different d1 values, without going the way again of the numerically solving of the above equations.

As the thickness of the Grids (5, 6, 7) is not negligible, the mentioned distances (45, 46) may be considered to be from the middle to the middle of the Grid thickness. This fact, of course, has to be considered by the definition of the effective distance between the Grids for the determination of the maximum voltage respecting the spark breakdown voltage level and for the determination of the electrostatic field, $E = U/d_{effective}$.

Of course, the distances between the Grids can be set to the same length, but then the Voltages of the phases to the Grids have to adequately be adapted because the frequency remains constant, i.e. if $d1 < d2 < d3 < \ldots < dn$ then $U_{d1} = U_{d2} = U_{d3} = \ldots = U_{dn}$ whereas if $d1 = d2 = d3 = \ldots = dn$ then $U_{d1} > U_{d2} > U_{d3} > \ldots > U_{dn}$, but this constrains too much the electronics and so is not recommended.

4. The Grids (5, 6, 7) of the apparatus in aspect 2 can preferably be constructed within a full body (9) of electrical insulating material (e.g. ceramic, or quartz-glass, etc.). The small holes (28) of the Grids (8) may then be drilled in this configuration, and as such, they are straight and so relaxes the tolerance requirements of the holes from Grid to Grid. This configuration ensures that the track of the Ions respectively Electrons remains within the holes, which on one hand is supported by the focusing of the Ions at the passage through the Grids (32, 37, 38) and on the other hand the electrostatic field within the body is weakened by the relative permittivity ($\varepsilon_r$) of the insulating material (e.g. ceramic: $6 < \varepsilon_r < 10$) thus the electrostatic field is much stronger in the holes and not in insulator and as such improves the focusing of the Ions (32, 37, 38) and the generated force, $F = q*E$. Of course, the apparatus can be constructed only with the Grids (5, 6, 7), i.e. not full body (9), which are then supported by the housing (43) of the apparatus electrically insulated by adequate material, e.g. ceramic, but the track of the Ions could, sometimes, not be exactly straight and may not be recovered by the focusing of the Ions (32, 37, 38) and so, the Ions could perpendicularly hit the Grid at very high velocity resulting in to the said unwanted Grid sputtering.

The symmetrical arrangement of the Grid (8) holes (28), FIG. 1, in a round Ion-Thruster/-Accelerator, follows the relation: h(0)=1 hole, h(1)=1 hole, h(2)=7 holes, h(3)=19 holes, h(4)=37 holes, etc. and generally:

$$h(n) = 2*h(n-1) - h(n-2) + 6$$

where n≥2 representing the configuration number.
For example, configuration n=3 results in:

$$h(3) = 2*h(2) - h(1) + 6 = 2*7 - 1 + 6 = 19 \text{ holes.}$$

5. The frequency of the Polyphase Alternating Current mentioned in aspect 2 is adjusted in order to respect the Ion passages through the Grids as mentioned in aspect 3 and can be depicted from FIG. 6 for 3-phases or FIG. 7 for 6-phases, using Xenon (Xe) as propellant gas, or accurately be estimated using the equation for different propellant gases:

$$f = \sqrt{C1_{(d1)} * C2_{(d1)}^2 * q * U_R / (m * d1^2)}$$

where q is the elementary charge 1,6022E-19 in A*s, U is the Voltage of the polyphase alternating current in Volts, m is the Atom mass of the used propellant gas in kg (e.g. Xe=2,196E-25 kg, or N=2,34167E-26 kg, etc.) and d1 (45), i.e. distance between first Grid (5) and second Grid (6), in meters. The factors $C1_{(d1)}$ and $C2_{(d1)}$ depend on the number of the phases of the Alternating Current and on the distance d1(45). The factor $C1_{(d1)}$ can be depicted from FIG. 8 for 3- or 6-phases rectangular shape Alternating Current and FIG. 9 for sinus shape Alternating Current. The factor $C2_{(d1)}$ is derived from the relation of Ion passage through the second Grid (6), see aspect 3, and lasts for 3-phases to $C2_{(d1)} = 3*((120°+10°)/360°) = 1,0833/3$, because the phase shift here is $360°/3$-phases and so the passage shall be shortly after ⅓ (i.e. +10°) of the first phase ($U_R$) period on Grid (5) whereas for 6-phases lasts to $C2_{(d1)} = 6*((60°+7°)/360°) = 1,117/6$, as the phase shift here is $360°/6$-phases and so the passage shall be shortly after ⅙ (i.e. +7°) of the first phase ($U_R$) period on Grid (5). The shape of the voltage can be sinus, rectangular, or other possible shape. Nevertheless, proposed are, but not limited to, three phases Rectangular shaped with a phase shift of 120° between them and with a delay of certain degree ($\cong 10°$) between the end of the positive half-wave and beginning of the negative half-wave and vice versa (51). This delay acts as a kind of a "dead-time" necessary for the protection of the MOSFET-pairs in the high frequency double-H-bridge mentioned in aspect 8. This "dead-time" is not necessary in case of sinus shape polyphase alternating current.

6. The mentioned linear Traveling Electrostatic Field in aspect 2 enables the acceleration of the Ions (25) synchronously to the exit (40) of the apparatus in the positive half-wave of the first phase "$U_R$", i.e. of the first Grid (5) and the Electrons (26) on the negative half-wave, i.e. a shift of 180°. Therefore, the Ion beam at the exit (40) of the Ion-Thruster/-Accelerator is not continuous, but rather than pulsed in the frequency of the polyphase alternating current (34, 36), FIG. 5. The distance between them corresponds to the wave length which is equal to velocity (v) of the plasma divided by the Frequency (f), i.e. $\lambda=v/f$ and with the correct adjusted frequency in accordance to the equation of aspect 5, is roughly twice longer than the length (l) of the Ion-Accelerator (4) itself, i.e. $\lambda \cong 2*l$, compare distance between the first Grid (5) and third Grid (7) with the wave length. On the other hand, as the velocity of the Electrons is much higher than the velocity of the Ions (compare the mass of the Electron to the mass of the Ion), even the Electrons are accelerated in the next half wave of the phase "$U_R$" of the alternating current (33), they will reach the Ions after the exit (40) of the Ion-Thruster/-Accelerator (4), i.e. shortly after $\lambda/2$ of the Ion wave length (35), see FIG. 5, and so neutralise them. Thus, a separate Neutralizer function is not necessary.

7. The three phases of the High Frequency High Voltage Alternating Current (11, 19) of aspect 3 rectangular shape, are generated by, but not limited to, a three-phase double-H-bridge consisting of six high voltage, high frequency, high-power MOSFET's. The MOSFET's, because of the selected rectangular shaped alternating current, can be used as pure switches, i.e. ON or OFF, minimising the constraints to the electronics (11). The rectangular shape alternating current (51) can then digitally be generated by the controller (15) and as such simplifies the electronics. As the thrust level can be varied by varying the high voltage, the frequency has to be adjusted by the controller in order to ensure the functionality mentioned in aspect 3. Therefore, the high voltage is continuously sensed by the controller in order to set the corresponding frequency using the equation of aspect 5. The high voltage to feed the high frequency double-H-bridge generating the polyphase high voltage high frequency alternating current, is generated by a double-H bridge of six low voltage, high power MOSFET's. The three phases of low voltage rectangular shape alternating current with a frequency around 45 kHz to 75 kHz, is connected to the high frequency transformers. The star connection at the output of the transformers has the advantage that the generated high voltage is around $\sqrt{3}$ higher than for one phase and by this the transformers need less windings on the secondary coils. The generated alternating current on the secondary coils of the transformers are connected to six high voltage high frequency rectifier-Diodes. The ripple of the rectified current is smoothed with a filter realised by two high voltage capacitors and one inductance.

8. The Ions (25) and free Electrons (26) are generated within the Ionization Chamber (3), which in this invention is shaped, but not limited to, conically for better distribution of the ionized propellant gas to the Ion-Accelerator (4). It consists of the body (18), which is made of electrically insulated material and with less losses to magnetic fluxes, such as ceramic or quartz glass, etc. which in addition avoids an assimilation of the Electrons by the apparatus housing (43). In this way the Ions (25) and Electrons (26) are resting within the Ionization Chamber (3) so long, up to the time when they will be attracted by the Accelerator's linear Traveling Electrostatic Field (29) and accelerated through the Grids (5, 6, 7) towards the Ion-Thruster/-Accelerator exit (40).

9. The Ions (25) and the free Electrons (26) are generated within the Ionization Chamber (3) by a linear traveling electromagnetic field (24) the direction of which is towards to the acceleration Grid (5) of the Ion-Accelerator (4) inlet (39). The linear traveling electromagnetic field (24) enables on one hand the ionization process (44) along the whole length of the Ionization Chamber, FIG. 2 and not only in the core of the electromagnetic field, as it is the case with only one phase, and on the other hand the generated Ions (25) and Electrons (26), as said, are accelerated to the inlet (39) Grid (5) of the Ion-Accelerator (4), following the linear traveling electromagnetic field. The free Electrons (26) respectively the new generated Ions (25) are continuously counter-rotating, because of their charge and accelerated in their initial direction and so they can achieve very high velocities and consequently gain a very high kinetic energy, where, by inelastic collision with the fresh incoming propellant gas, enables a self-sustaining generation of Ions (25) and free Electrons (26) with a very high gain. The linear traveling electromagnetic field (24) is generated by, but not limited to, three phases High Frequency (HF) coils (16) fed with a three-phase high frequency alternating current (12, 20), the frequency of which could be in the range of 0,6 MHz to 2 MHz, but nevertheless, should be adapted to the frequency of the polyphase Ion-Accelerator (4) of aspect 5.

10. In this invention, in order to enhance the electromagnetic field (24) within the Ionization Chamber (3) and on the other hand, to minimise disturbing stray electromagnetic field, the high frequency coils (16) are covered by Rings (17), see FIG. 2, of ferromagnetic material with very high electrical resistance (for example >10 MOhm), in order to minimise eddy current, and very low resistance to the magnetic fluxes (for example with a permeability of >15000), as e.g. Ferrite adequate for high power and high frequency, similar to those used in high frequency high power transformers. The rings enable on one hand a strong electromagnetic field (24) coil by coil within the ionization chamber (3) and on the other hand with the three phases (20) of aspect 9 the linear traveling electromagnetic field is established.

11. To start the ionization process of aspect 9, a simple Ionizer Igniter (2) consisting of lamellae which are connected to the high voltage direct current (DC) (13, 21) and with the established electrostatic field generates certain negative Ions (23) which are transported to the ionization chamber (3) inlet (52) by the nominal propellant gas flow. These negatively charged Ions with the influence of the linear traveling electromagnetic field (24) and as said, are forced to rotate (25) radially to the axis of the ionization chamber and as such collide with the fresh incoming propellant gas atoms at a high velocity and by an inelastic collision removes an electron free and so ionizing the propellant gas respectively gains free electrons for the further ionization process. These free Electrons (26) and the new generated Ions (25) are continuously counter-rotating radially along the axis of the Ionization Chamber (3) and so initiates a chain-reaction producing self-sustaining new Ions and Electrons and so on. After the successful ignition of the Ion plasma (27.1) the Igniter (2), as its function is no longer needed, may be switched off in order to save electrical power.

The features of the invention disclosed in the above description, in the drawings and in the claims may be essential both individually and in any combinations for the realization of the invention in its various embodiments.

LIST OF REFERENCE SIGNS 1 propellant gas inlet port
2 igniter
3 ionization chamber
4 ion accelerator
5 first acceleration grid
6 second acceleration grid
7 third acceleration grid
8 front face of an acceleration grid
9 body of the ion accelerator
10 electronics part
11 polyphase high voltage high frequency power generating unit
12 3-phases high frequency ionization power generating unit
13 ignition circuit
14 power management unit
15 controlling unit
16 high frequency (HF) coils
17 rings of ferromagnetic material surrounding the high frequency coils
18 body of ionization chamber
19 3-phases high frequency alternating current to ion accelerator
20 3-phases high voltage high frequency alternating current to ionization chamber
21 high voltage direct current to igniter
22.1 propellant gas source
22.2 valve
22.3 reducer
23 negatively charged ions
24 linear traveling electromagnetic field within ionization chamber
25 generated ions
26 generated electrons
27.1 axial and radial electromagnetic force vectors acting on the ions
27.2 axial and radial electromagnetic force vectors acting on the electrons
28 holes of the acceleration grids of the ion accelerator
29 linear traveling electrostatic field between first and second acceleration grid in the positive half wave of the first phase ($U_R$)
30 linear traveling electrostatic field between second and third acceleration grid in the positive half wave of the first phase ($U_R$)
31 linear traveling electrostatic field between third and first acceleration grid in the positive half wave of the first phase ($U_R$)
32 ion focusing within one hole of the first acceleration grid
33 pulsed electron beam
34, pulsed ion beam
35 moment of ion neutralization
36 pulsed neutralized ion beam
37 ion focusing within one hole of the second acceleration grid
38 ion focusing within one hole of the third acceleration grid
39 inlet of the ion accelerator
40 exit of the ion accelerator
43 housing of the ion thruster
44 ionisation process along the ionisation chamber length
45 d1: distance between first acceleration grid and second acceleration grid
46 d2: distance between second acceleration grid and third acceleration grid
47 exit of the ionization chamber
48 linear traveling electrostatic field between first and second acceleration grid in the negative half wave of the first phase ($U_R$)
49 linear traveling electrostatic field between second and third acceleration grid in the negative half wave of the first phase ($U_R$)
50 linear traveling electrostatic field between third and first acceleration grid in the negative half wave of the first phase ($U_R$)
51 rectangular shape Voltage of the first phase ($U_R$) connected to first acceleration grid
52 inlet of the ionization chamber
100 ion thruster
$E_{(R-S)}$ electrostatic field between first acceleration grid and second acceleration grid
$E_{(S-T)}$ electrostatic filed between second acceleration grid and third acceleration grid
$E_{(T-R)}$ electrostatic field between third acceleration grid and first acceleration grid
$U_R$, $U_S$, $U_T$ Voltage of first, second and third phase of the high frequency power generating unit
$U_{R'}$, $U_{S'}$, $U_{T'}$ Voltage of first, second and third phase of the high frequency ionization power generating unit
$C1_{(d1):\ 3\text{-}phases}$ Constant factor for the three phases frequency calculation depending on the d1 (distance between first and second acceleration grid)
$C1_{(d1):\ 6\text{-}phases}$ Constant factor for the six phases frequency calculation depending on the d1 (distance between first and second acceleration grid)
f[MHz] frequency in MHz of the acceleration polyphase alternating current depending on the voltage and d1 (distance between first and second acceleration grid)

The invention claimed is:
1. An ion propulsion device, the device comprising:
a plurality of emission modules arranged in an emission plane of the device, each said emission module comprising an insulating support, an emission electrode arranged on the insulating support, and a tank of conductive liquid with a microfluidic channel arranged to deposit conductive liquid on the emission electrode;
an extraction electrode common to the plurality of emission modules and arranged opposite the plurality of emission modules; and
at least one control unit;
wherein:
each said emission module is configured to emit an ion beam when an electric field is applied to the conductive liquid;
the at least one control unit is configured to control an emission current of the ions emitted by the application of a potential difference between at least one emission electrode of the plurality of emission electrodes and the extraction electrode;
the emission electrodes of the plurality of emission modules are spaced apart from one another by a linear distance l greater than a breakdown distance between two adjacent emission electrodes separated by an empty space, the linear distance l being less than the propagation distance of an electric leakage current by hopping conduction along the insulating support between the emission electrodes; and a length L of an insulating support between the emission electrodes is greater than a propagation distance of an electric leakage current by hopping conduction along the insulating support between the emission electrodes, the linear distance I and the length L of the insulating support being chosen so as to l maximize the number of the plurality of emission modules in the emission plane.

2. The electrostatic ion thruster of claim 1, wherein said polyphase high voltage high frequency power generating unit is adapted to generate a polyphase high voltage high frequency alternating current and to generate a linear traveling electrostatic field across said at least three acceleration grids.

3. The electrostatic ion thruster of claim 1, wherein said at least three acceleration grids are electrically connected to said polyphase high voltage high frequency power generating unit and said polyphase high voltage high frequency power generating unit is at least a 3-phases high voltage power generating unit, wherein the sequence of the phases of said polyphase high voltage high frequency power generating unit is set such that a linear traveling electrostatic field generated thereby travels from said inlet towards said exit of said ion accelerator.

4. The electrostatic ion thruster of claim 1, wherein a respective applied voltage of each phase from said polyphase high voltage high frequency power generating unit have the same magnitude and a respective distance between adjacent acceleration grids among the at least three acceleration grids increases from said ion accelerator inlet of said ion accelerator to said ion accelerator exit of said ion accelerator.

5. The electrostatic ion thruster of claim 1, wherein:

said polyphase high voltage high frequency power generating unit generates three phases, each corresponding to one of a first acceleration grid, a second acceleration grid, and a third acceleration grid of said at least three acceleration grids in an order from said ion accelerator inlet to said ion accelerator exit of said ion accelerator, wherein a distance d2 between the second acceleration grid and the third acceleration grid corresponds to the solution of the equation:

$$d2^2 - d1*d2 - 3.3127*d1^2 = 0,$$

where d1 is a distance between the first acceleration grid and the second acceleration grid.

6. The electrostatic ion thruster of claim 1, wherein distances between respective adjacent acceleration grids among said at least three acceleration grids are the same and wherein respective applied voltages of phases from said polyphase high voltage high frequency power generating unit decrease from said ion accelerator inlet of said ion accelerator to said ion accelerator exit of said ion accelerator.

7. The electrostatic ion thruster of claim 1, wherein said at least three acceleration grids are defined within a full body of electrical insulating material, wherein holes of said at least three acceleration grids are formed in said full body.

8. The electrostatic ion thruster of claim 1, wherein said polyphase high voltage high frequency power generating unit is adapted to generate at least 3-phases alternating current, the frequency thereof being set according to the equation $$f = \sqrt{C1_{(d1)} * C2_{(d1)}^2 * q * U_R / (m * d1^2)}$$

where q is the elementary charge 1.6022E-19 in A*s, $U_R$ is the voltage of the polyphase alternating current in Volts, m is the Atom mass of the propellant gas in kg, d1 is a distance between the first acceleration grid and the second acceleration grid and $C1_{(d1)}$ and $C2_{(d1)}$ are constants depending on the number of phases, ion passage through the second acceleration grid and the shape of said 3-phases alternating current generated by said polyphase high voltage high frequency power generating unit.

9. The electrostatic ion thruster of claim 1, wherein said ionization chamber is a conical body made of electrically insulating material.

10. The electrostatic ion thruster of claim 1, wherein said high frequency ionization power generating unit is adapted to generate alternating current with a frequency in a range of 0.6 MHz to 2 MHz, said frequency being adapted to a frequency of the alternating current generated by said polyphase high voltage high frequency power generating unit.

11. The electrostatic ion thruster of claim 1, wherein said at least three high frequency coils are covered by rings of ferromagnetic material formed such that the linear traveling electromagnetic field is directed towards said central axis of said ionization chamber.

12. The electrostatic ion thruster of claim 1, wherein said igniter comprises lamellae electrically connected to the high voltage direct current generated by said ignition circuit.

13. The electrostatic ion thruster of claim 1, wherein said polyphase high voltage high frequency power generating unit is adapted to generate a polyphase high voltage high frequency alternating current and to generate a linear traveling electrostatic field across said at least three acceleration grids wherein there is a phase shift of 120° between phases of said alternating current in a case of three phases or a phase shift of 60° in a case of six phases.

14. The electrostatic ion thruster of claim 4 wherein said at least three acceleration grids are at least six acceleration grids arranged in order from said ion accelerator inlet to said ion accelerator exit as follows: a first acceleration grid, a second acceleration grid, a third acceleration grid, a fourth acceleration grid, a fifth acceleration grid and a sixth acceleration grid, where said polyphase high voltage high frequency power generating unit generates six phases each corresponding to one of said at least six acceleration grids, wherein the distances d2, d3, d4, d5 correspond to the solution of the equations:

$$d2^2 - d1*d2 - 3.6506*d1^2 = 0,$$

$$d3^2 - d2*d3 - 0.6230*d2^2 = 0,$$

$$d4^2 - d3*d4 - 0.2071*d3^2 = 0, \text{ and}$$

$$d5^2 - d4*d5 - 0.1194*d4^2 = 0,$$

where d1, d2, d3, d4, d5 are respectively a distance between adjacent pairs of said at least six acceleration grids in order from said ion accelerator inlet to said ion accelerator exit.

* * * * *